United States Patent
Joshi et al.

(10) Patent No.: US 12,031,566 B2
(45) Date of Patent: Jul. 9, 2024

(54) RIVETED ASSEMBLIES AND METHODS FOR RIVETING COMPONENTS

(71) Applicant: BATTELLE MEMORIAL INSTITUTE, Richland, WA (US)

(72) Inventors: Vineet V. Joshi, Richland, WA (US); Sina Shahrezaei, Richland, WA (US); Curt A. Lavender, Richland, WA (US); Rob J. Seffens, Kennewick, WA (US); Mark A. Rhodes, Kennewick, WA (US); Darrell R. Herling, Kennewick, WA (US); Aashish Rohatgi, Richland, WA (US)

(73) Assignee: Battelle Memorial Institute, Richland, WA (US)

( * ) Notice: Subject to any disclaimer, the term of this patent is extended or adjusted under 35 U.S.C. 154(b) by 0 days.

(21) Appl. No.: 17/743,413

(22) Filed: May 12, 2022

(65) Prior Publication Data

US 2022/0275818 A1    Sep. 1, 2022

Related U.S. Application Data

(63) Continuation of application No. 17/193,669, filed on Mar. 5, 2021, now Pat. No. 11,460,059.
(Continued)

(51) Int. Cl.
*F16B 19/08* (2006.01)
*B21J 15/02* (2006.01)
*F16B 5/04* (2006.01)

(52) U.S. Cl.
CPC ............. *F16B 5/04* (2013.01); *B21J 15/025* (2013.01); *F16B 19/08* (2013.01)

(58) Field of Classification Search
CPC .. F16B 5/04; F16B 19/00; F16B 19/04; F16B 19/06; F16B 19/08; F16B 21/00;
(Continued)

(56) References Cited

U.S. PATENT DOCUMENTS

| 2,040,939 A | 5/1936 | Huck |
| 2,237,338 A | 4/1941 | Dale |

(Continued)

OTHER PUBLICATIONS

ATF, Inc., "FDS® The Flow-Drill Screw for High-Strength Sheet Joints", Available online at https://www.atf-inc.com/wp-content/uploads/2017/02/ATFFDS2017LowRes.pdf, 2017, 18 pages.
(Continued)

*Primary Examiner* — Roberta S Delisle
(74) *Attorney, Agent, or Firm* — Wells St. John P.S.

(57) ABSTRACT

Riveted assemblies are provided that can include: a first component having opposing first and second sidewalls; a second component having opposing third and fourth sidewalls, wherein the second sidewall of the first component abuts the third sidewall of the second component to bind and form an affixing interface comprising the second and third sidewall between the first component to the second component; and a rivet extending between a head along a shank to an end, the rivet piercing the first sidewall with the end of the rivet being between the first and fourth sidewalls. Methods for affixing at least two components using a rivet are also provided. The methods can include: providing a first component having opposing first and second sidewalls; providing a second component having opposing third and fourth sidewalls; abutting the second sidewall of the first component to the third sidewall of the second component; providing a rivet extending between a head along a shank to an end; projecting the rivet through at least the first sidewall of the first component to form an affixing interface comprising the second and third sidewalls.

10 Claims, 23 Drawing Sheets

Related U.S. Application Data

(60) Provisional application No. 62/986,495, filed on Mar. 6, 2020.

(58) Field of Classification Search
CPC . F16B 21/086; B21J 15/025; Y10T 29/49943; Y10T 29/49956
USPC .......................... 403/376; 411/500, 501, 504
See application file for complete search history.

(56) References Cited

U.S. PATENT DOCUMENTS

| | | | |
|---|---|---|---|
| 2,465,534 A | | 3/1949 | Havener |
| 2,510,693 A | | 6/1950 | Green |
| 3,630,116 A | | 12/1971 | Harper |
| 5,015,136 A | * | 5/1991 | Vetter ..................... F16B 19/06 29/444 |
| 5,475,993 A | | 12/1995 | Kuo |
| 6,045,291 A | | 4/2000 | Ruehle et al. |
| 6,637,995 B1 | | 10/2003 | White |
| 6,835,020 B2 | * | 12/2004 | Wang ..................... B21J 15/025 411/501 |
| 7,284,319 B2 | * | 10/2007 | Kato ........................ B21J 15/36 411/501 |
| 7,351,022 B2 | | 4/2008 | Denslow |
| 10,286,962 B2 | * | 5/2019 | Freis ..................... B62D 25/14 |
| 2005/0019137 A1 | * | 1/2005 | Iwatsuki ............... B21J 15/025 411/501 |
| 2009/0116934 A1 | * | 5/2009 | Trinick ................. F16B 19/086 411/501 |
| 2010/0018027 A1 | * | 1/2010 | Stevenson ............. B23K 26/22 29/243.53 |
| 2013/0094924 A1 | * | 4/2013 | Lee ....................... F16B 19/086 411/502 |
| 2013/0340239 A1 | | 12/2013 | Ueda et al. |
| 2014/0133937 A1 | | 5/2014 | Tyson et al. |
| 2015/0023729 A1 | | 1/2015 | Henriott et al. |
| 2015/0290914 A1 | * | 10/2015 | Campbell ................ B21J 15/08 156/92 |
| 2015/0362004 A1 | * | 12/2015 | Campbell ............. B21J 15/147 411/502 |
| 2015/0375792 A1 | * | 12/2015 | Campbell ............. F16B 19/086 411/501 |
| 2016/0115986 A1 | * | 4/2016 | Freis ........................ F16B 5/04 411/502 |
| 2018/0058488 A1 | * | 3/2018 | Wissling .................. F16B 5/04 |

OTHER PUBLICATIONS

Chen et al., "Optimization of a Reshaping Rivet to Reduce the Protrusion Height and Increase the Strength of Clinched Joints", Journal of Materials Processing Technology, vol. 234 (2016), Netherlands, pp. 1-9.

Groche, et al., "Joining by Forming—A Review on Joint Mechanisms, Applications and Future Trends", Journal of Materials Processing Technology, vol. 214 (2014), Netherlands, pp. 1972-1994.

Hirsch, "Aluminium in Innovative Light-Weight Car Design", Materials Transactions, vol. 52, Issue 5, 2011, Japan, pp. 818-824.

Hoang et al., "Self-Piercing Riveting Connections Using Aluminium Rivets", International Journal of Solids and Structures, vol. 47, Issues 3-4, 2010, United Kingdom, pp. 427-439.

Jonas et al., "Mechanics of Penetration: Analysis and Experiment", International Journal of Engineering Science, vol. 16, 1978, United Kingdom, pp. 879-903.

Li et al., "Self-Piercing Riveting—A Review", The International Journal of Advanced Manufacturing Technology, vol. 92, Nos. 5-8, 2017, United Kingdom, pp. 1777-1824.

Manladan et al., "A Review on Resistance Spot Welding of Magnesium Alloys", The International Journal of Advanced Manufacturing Technology, vol. 86, Nos. 5-8, 2016, United Kingdom, pp. 1805-1825.

Mucha et al., "Mechanical Behavior and Failure of Riveting Joints in Tensile and Shear Tests", Strength of Materials, vol. 47, 2015, United States, pp. 755-769.

Voelkner, "Present and Future Developments of Metal Forming: Selected Examples", Journal of Materials Processing Technology, vol. 106 (2000), Netherlands, pp. 236-242.

Wang et al., "A New Self-Piercing Riveting Process and Strength Evaluation", Journal of Manufacturing Science and Engineering, vol. 128 (2006) United States, pp. 580-587.

* cited by examiner

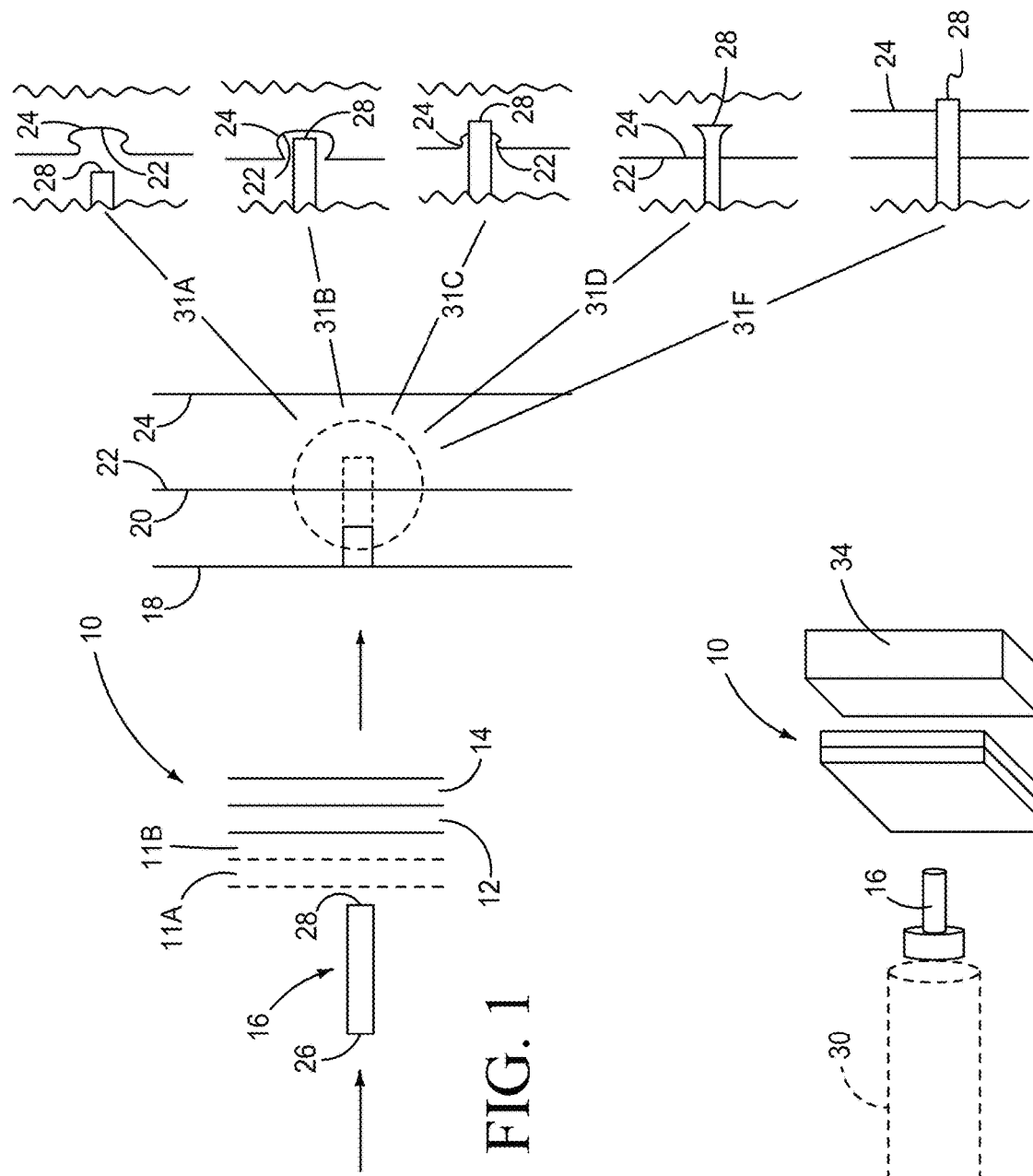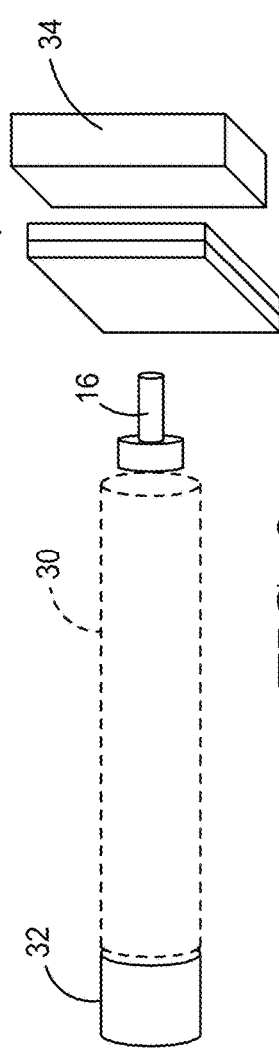
FIG. 1
FIG. 2

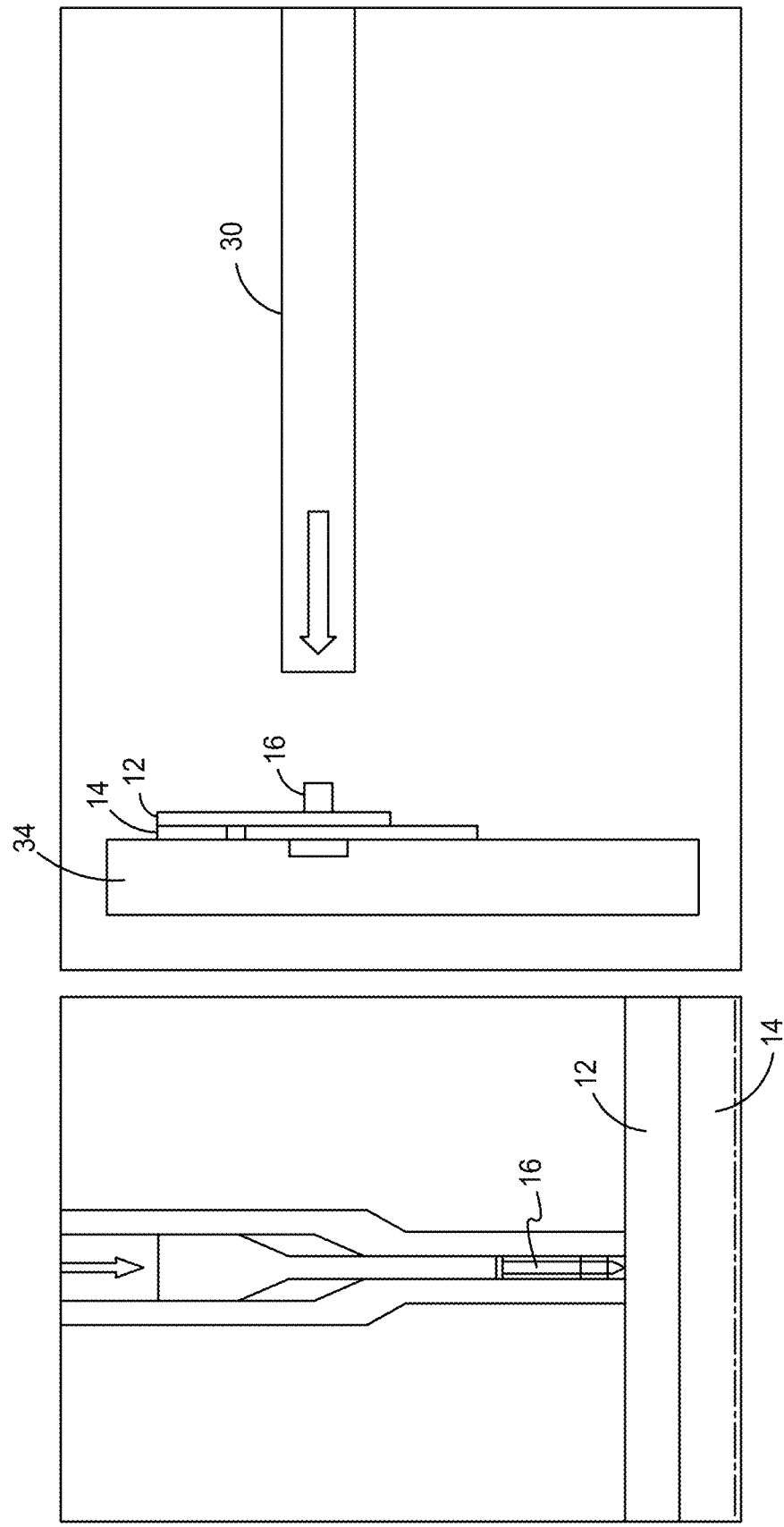

RIVETED ASSEMBLIES AND METHODS FOR RIVETING COMPONENTS

CROSS REFERENCE TO RELATED APPLICATION

This application is a continuation of U.S. patent application Ser. No. 17/193,669 which was filed on Mar. 5, 2021, entitled "Riveted Assemblies and Methods for Riveting Components", which claims priority to and the benefit of U.S. Provisional Patent Application Ser. No. 62/986,495 filed Mar. 6, 2020, entitled "High Strain Rate Riveting to Join Dissimilar Materials", the entirety of each of which is incorporated by reference herein.

STATEMENT AS TO RIGHTS TO DISCLOSURES MADE UNDER FEDERALLY-SPONSORED RESEARCH AND DEVELOPMENT

This invention was made with Government support under Contract DE-AC0576RL01830 awarded by the U.S. Department of Energy. The Government has certain rights in the invention.

TECHNICAL FIELD

The present disclosure relates to assemblies and methods of forming assemblies. In particular embodiments, the present disclosure relates to riveted assemblies and methods for affixing at least two components using a rivet to form an assembly.

BACKGROUND

Assemblies and methods for assembling components rely on techniques for affixing the components. These methods can include welding, riveting, and/or adhesion to name just a few examples. The components can be sheet components and/or frame and/or sheet and/or cast components, for example.

A critical challenge for the automotive industry includes reducing the environmental impact of vehicles propelled by combustion engines and reducing the cost of electrified vehicles, while maintaining the performance, safety and driver experience. Cost effective lightweighting applications have been demonstrated to include the use of components and multi-material assemblies comprised of advanced high strength steel, aluminum, carbon and glass fiber composites and cast magnesium and aluminum to achieve strength, durability, strain rate sensitivity, temperature, fatigue and visual product application requirements. Methods for affixing components play a key part in enabling commercialization of these complex multi-material systems.

Full vehicle mass reduction beyond 20% relative to a 2014 baseline passenger vehicle requires application of new multiple material combinations using novel low density, high strength material combinations which include application of carbon fiber (CF) reinforce thermoplastics and magnesium (Mg) sheet along with advanced high strength steel and aluminum alloys. Joining of aluminum, CF and Mg using steel rivets present galvanic corrosion and end of life recycling challenges. Due to the melting point differential, galvanic potential and solubility issues, conventional resistance spot welding is not feasible for many multi-material applications. Coated boron steel self-piercing rivets (SPR) are currently used to join aluminum/aluminum and aluminum/steel. Steel SPRs present galvanic corrosion, cost and recycling issues. Further, the application of SPRs introduce significant change in the body shop operations which add additional cost and lost production when existing operations are utilized.

Due to the melting point differential, galvanic potential and solubility issues, conventional resistance spot welding is not feasible for many multi-material applications. Resistance spot welding is not feasible for multi-material applications owing to the difference in melting points, galvanic potential and solubility issues. Riveting and more specifically self-piercing riveting utilizes coated boron steel rivets. However, with this configuration corrosion issues can arise due to differences in galvanic potentials especially between steel and magnesium and aluminum. In addition, this can cause issues with end-of-life recycling. Other techniques such as flow drill screws which are used to join high strength alloys and thick sections typically utilize steel rivets and produce the same challenges along with longer assembly times.

The present disclosure provides assemblies and methods that can be used to address at least some of these challenges.

SUMMARY

Riveted assemblies are provided that can include: a first component having opposing first and second sidewalls; a second component having opposing third and fourth sidewalls, wherein the second sidewall of the first component abuts the third sidewall of the second component to bind and form an affixing interface comprising the second and third sidewall between the first component to the second component; and a rivet extending between a head along a shank to an end, the rivet piercing the first sidewall with the end of the rivet being between the first and fourth sidewalls.

Methods for affixing at least two components using a rivet are also provided. The methods can include: providing a first component having opposing first and second sidewalls; providing a second component having opposing third and fourth sidewalls; abutting the second sidewall of the first component to the third sidewall of the second component; providing a rivet extending between a head along a shank to an end; projecting the rivet through at least the first sidewall of the first component to form an affixing interface comprising the second and third sidewalls.

DRAWINGS

Embodiments of the disclosure are described below with reference to the following accompanying drawings.

FIG. 1 is a depiction of a method for affixing components and example assemblies resulting from same according to an embodiment of the disclosure.

FIG. 2 is a depiction of a method for affixing components according to an embodiment of the disclosure.

FIGS. 4A-B depict A) powder actuated tool; B) gas-gun striker bar.

FIGS. 5A-D depicts A) Schematic of the powder actuated fastening of sheets, B) side, C) top, D) bottom views of two Mg AZ31 sheets joined together via a steel fastener.

Figure 6B:
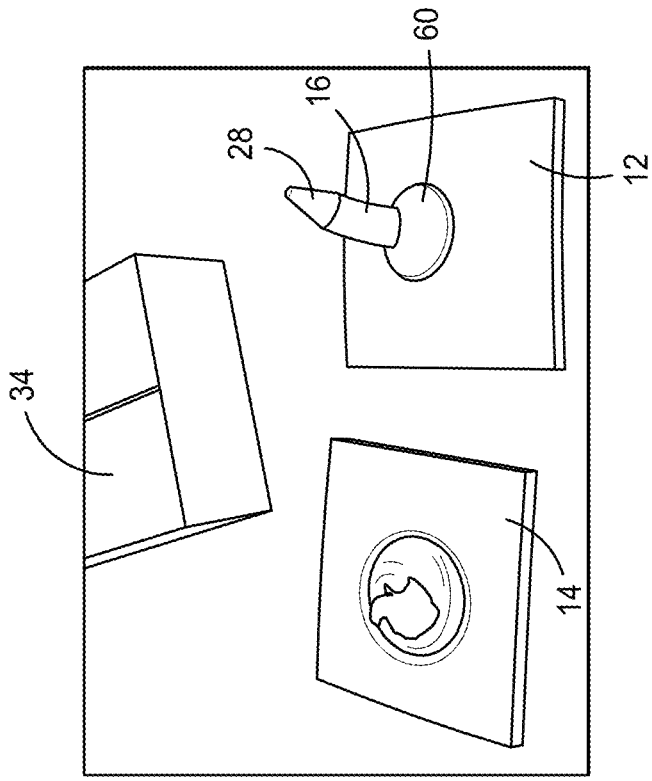
Figure 6A:
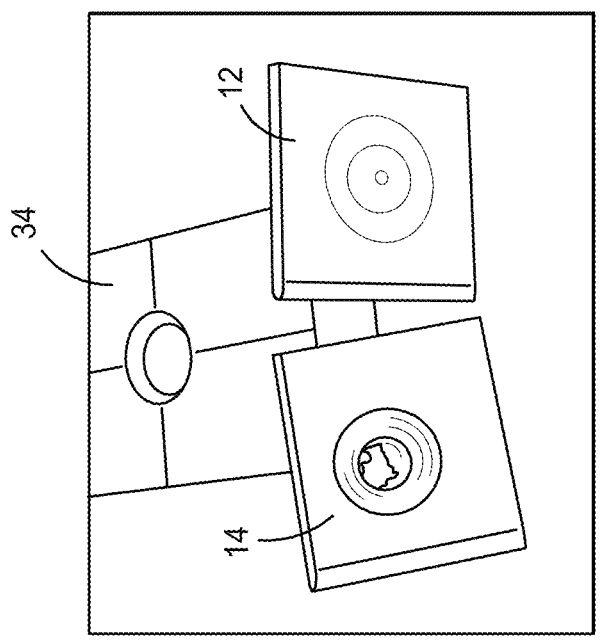

FIGS. 6A-B depict A) Top view, B) bottom view of the two aluminum sheets penetrated via an Al 6061 fastener.

Figure 7B:
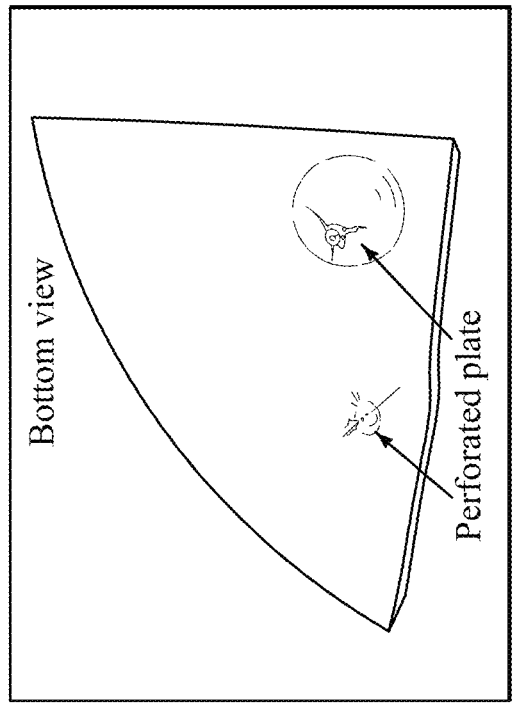
Figure 7A:
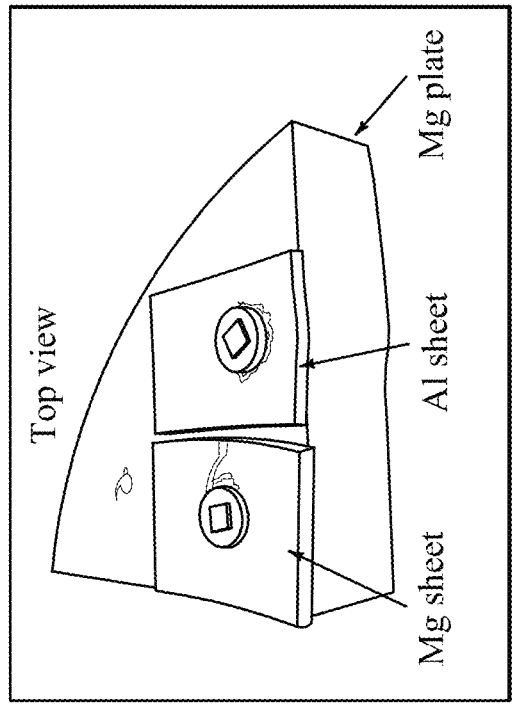

FIGS. 7A-B depict A) Top view, B) bottom view of Al 6061 and Mg AZ31 sheets joined to Mg plate.

Figure 8A:
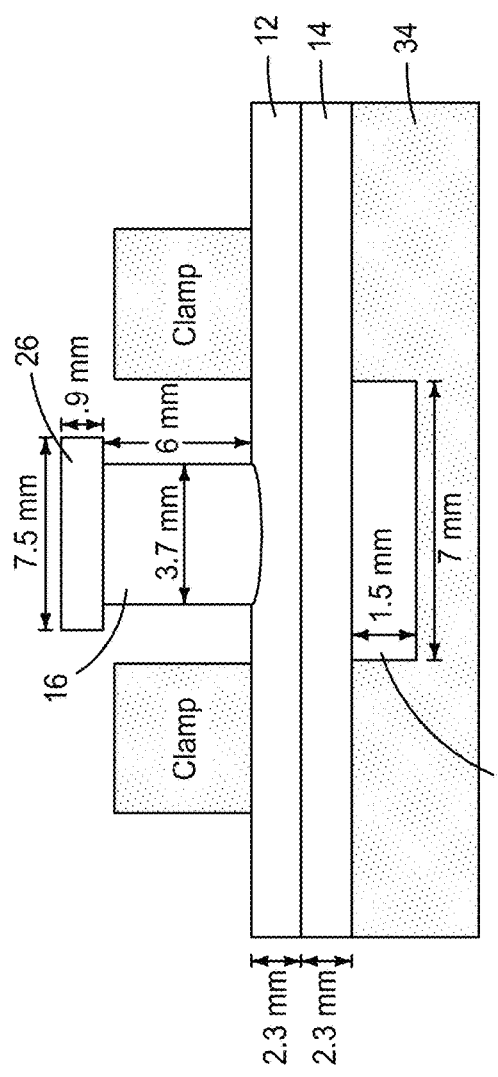
Figure 8B:
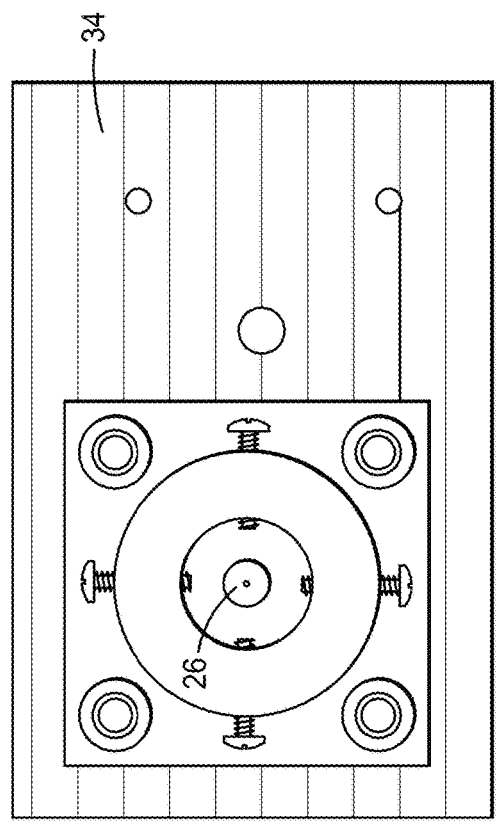
Figure 8C:
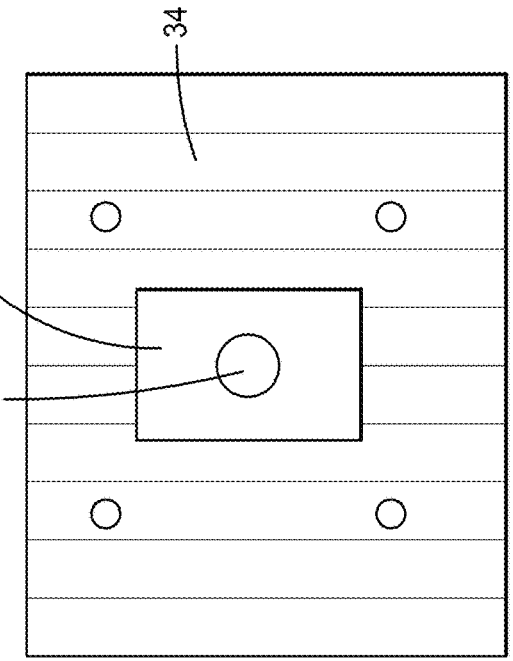

FIGS. 8A-C depict A) Schematic of the HSRR die, sheets, clamp and the rivet, B) clamp and die, C) Riveted sheets on the steel plate.

FIGS. 9A-F depict A) Top view of run #9, B) top view of run #1, C) CT image of run #1, D) bottom view of run #9, E) bottom view of run #1, F) CT segmented image of run #1 using an aluminum alloy rivet.

FIGS. 10A-F depict a bottom view of riveted A) Mg/Mg alloy sheets, B) Mg/Al alloy sheets, C) Al/Al alloy sheets, and CT image of riveted D) Mg/Mg alloy sheets, E) Mg/Al alloy sheets, F) Al/Al alloy sheets using aluminum alloy rivet.

Figure 11:
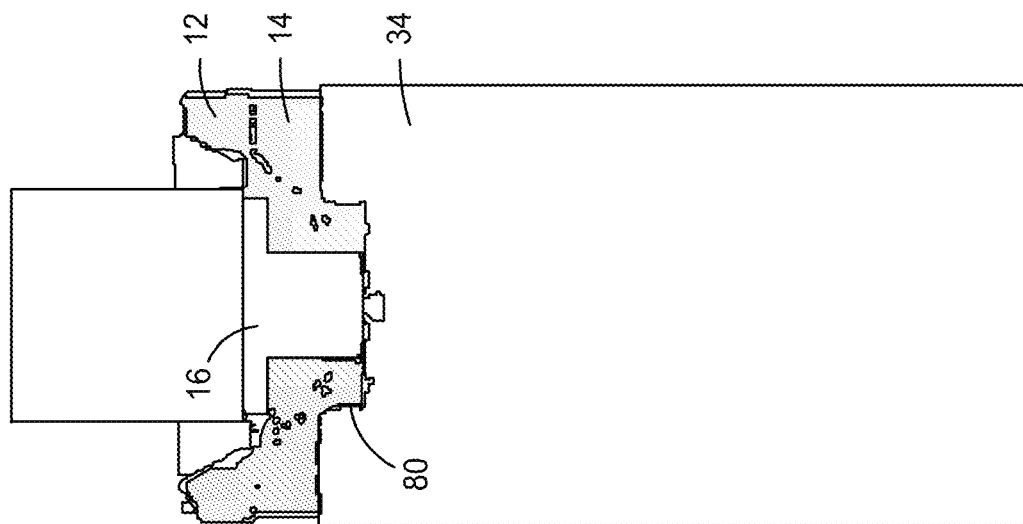

FIG. 11 depicts yet another configuration of a system for affixing materials.

Figure 12:
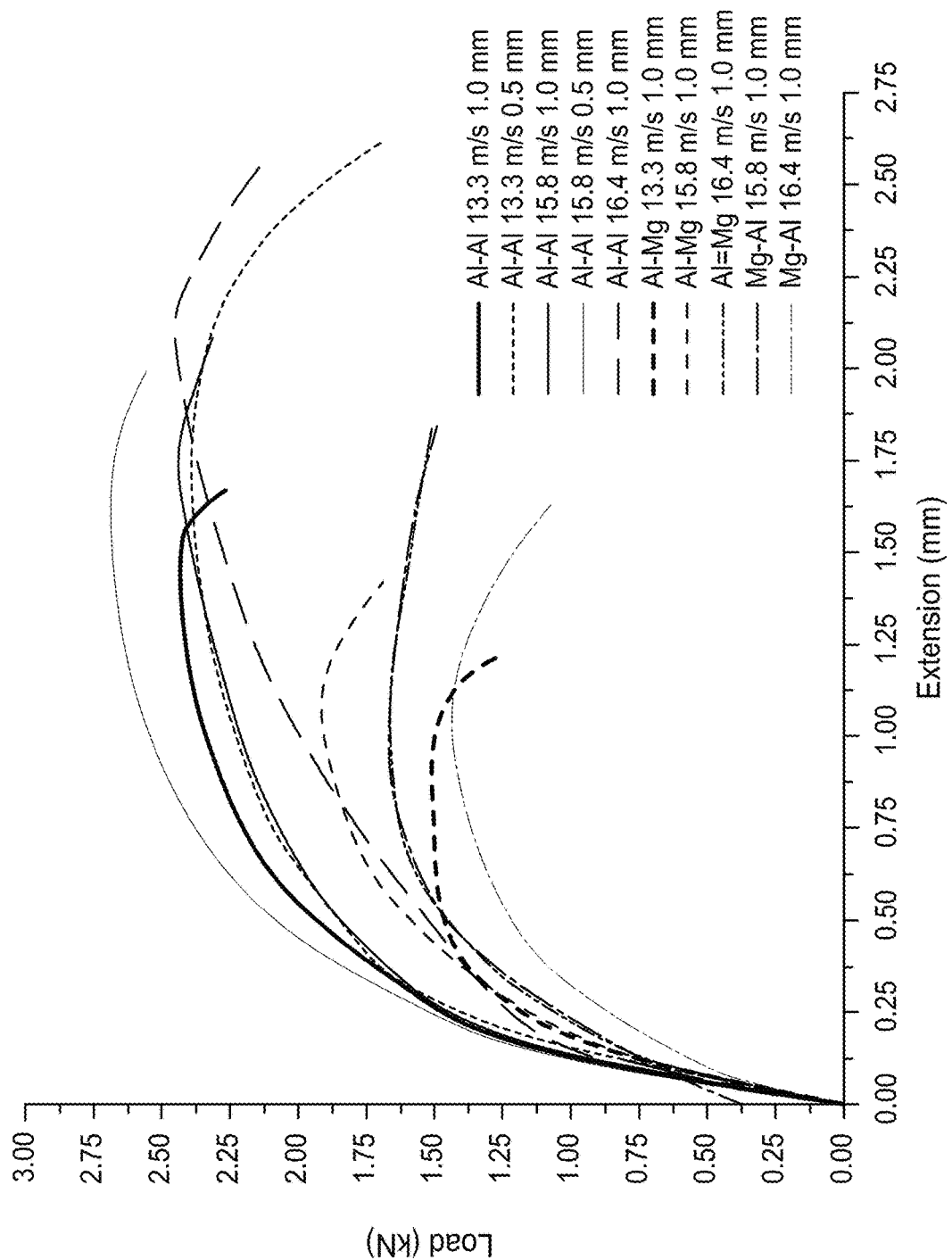

FIG. 12 depicts load-extension curves of lap shear tested, HSRR sheets at various striker bar speeds and die cavity depths.

Figure 13:
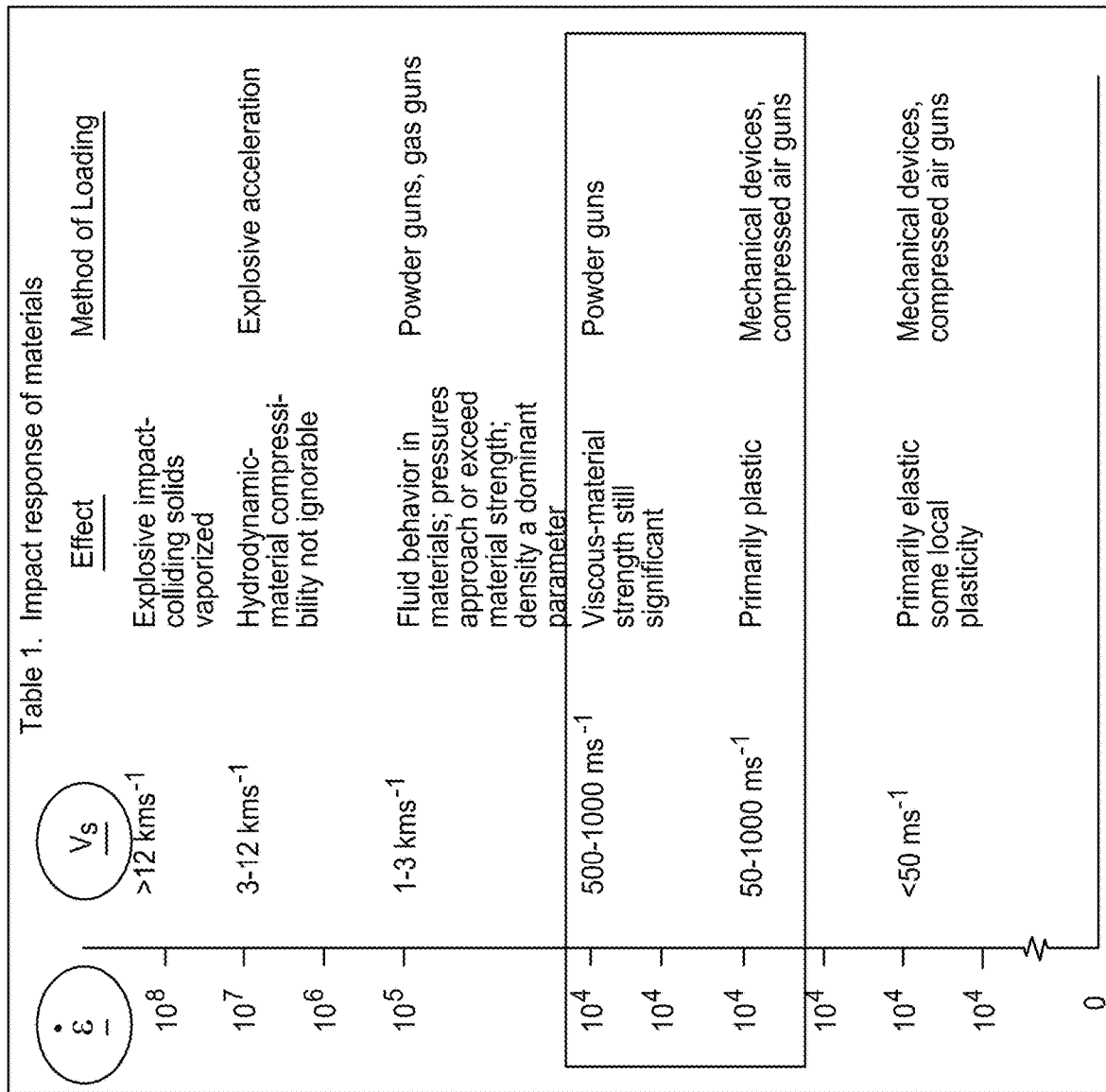

FIG. 13 is a chart of impact responses for materials.

Figure 14A:
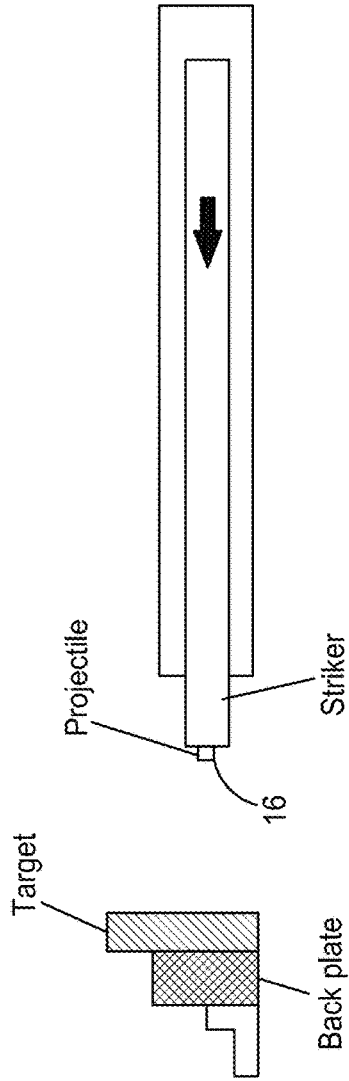

FIGS. 14A and B are configurations for systems for affixing materials.

Figures 15A, 15B, 15C:
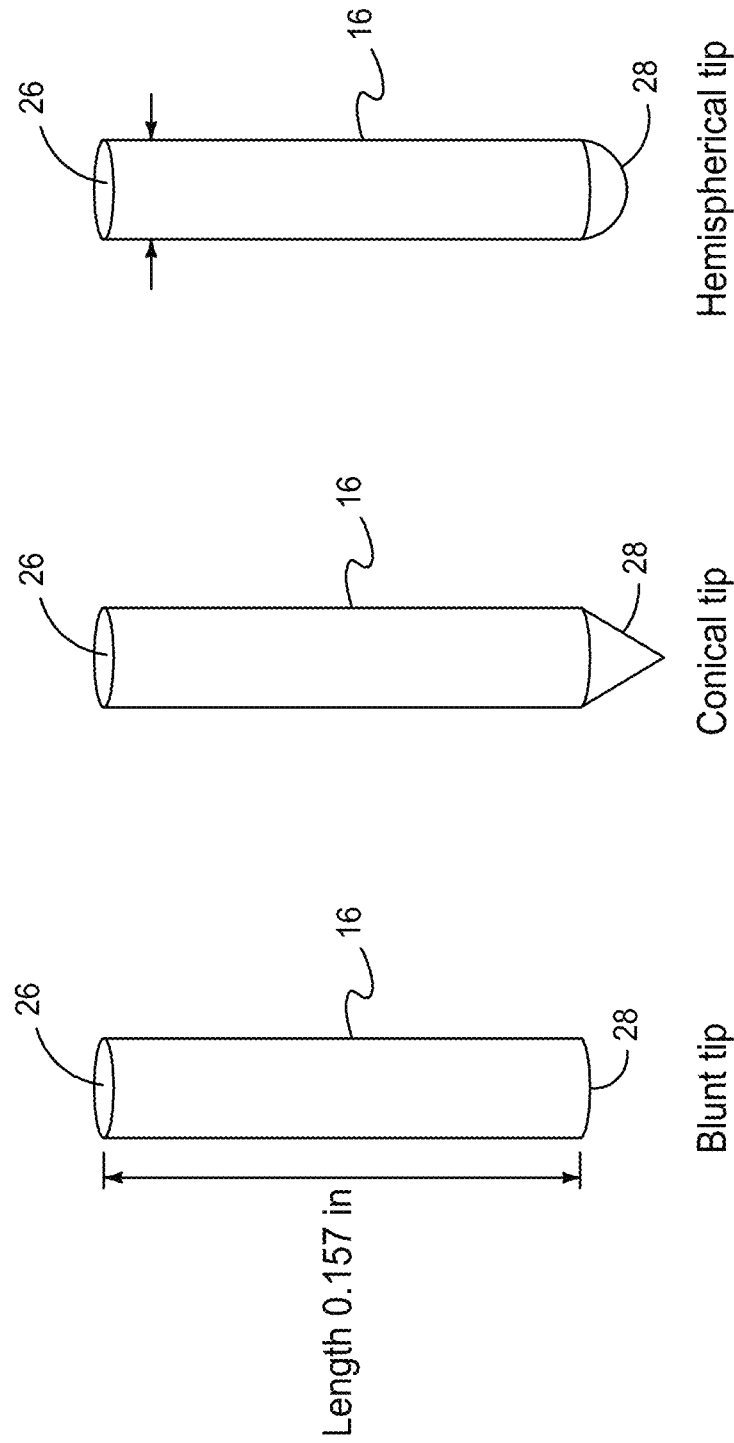

FIGS. 15A-C are depictions of rivet configurations.

Figure 16:
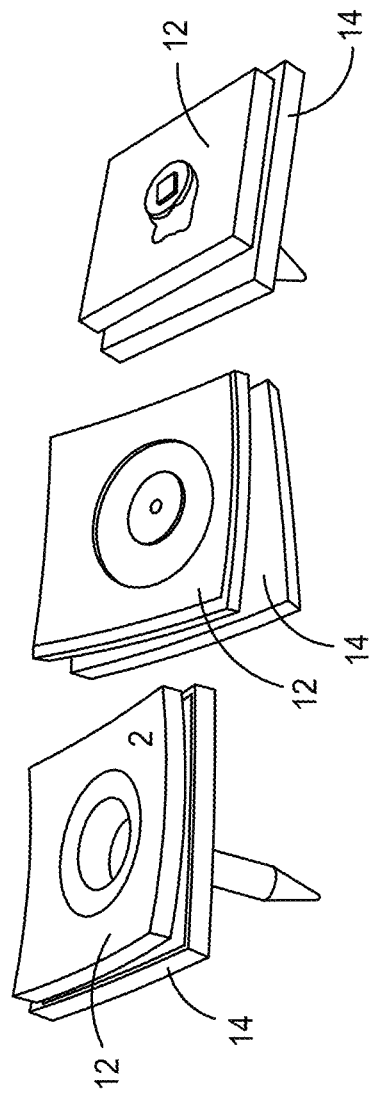

FIG. 16 depicts affixed materials with a conical tip showing through penetration.

Figure 17A:
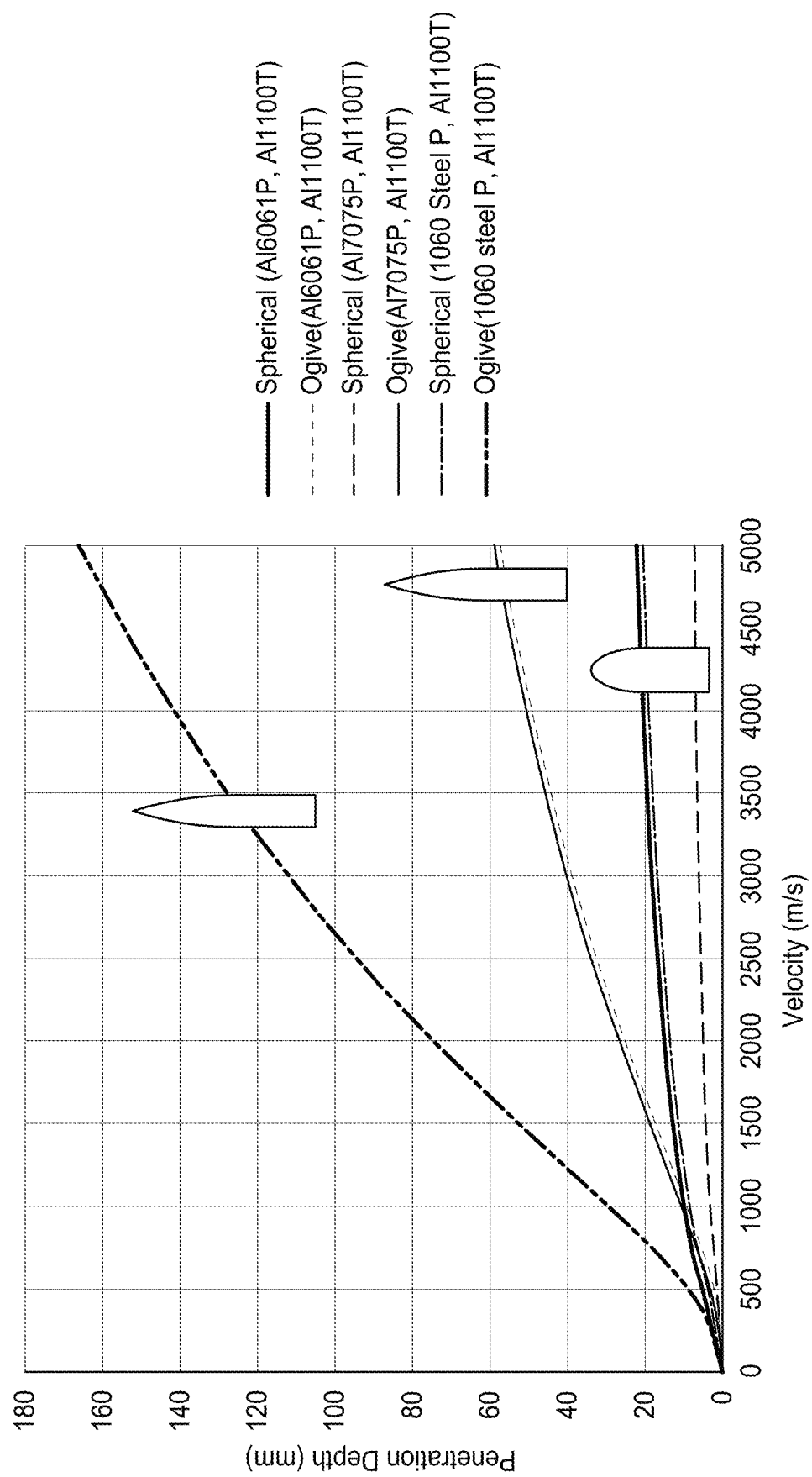
Figure 17B:
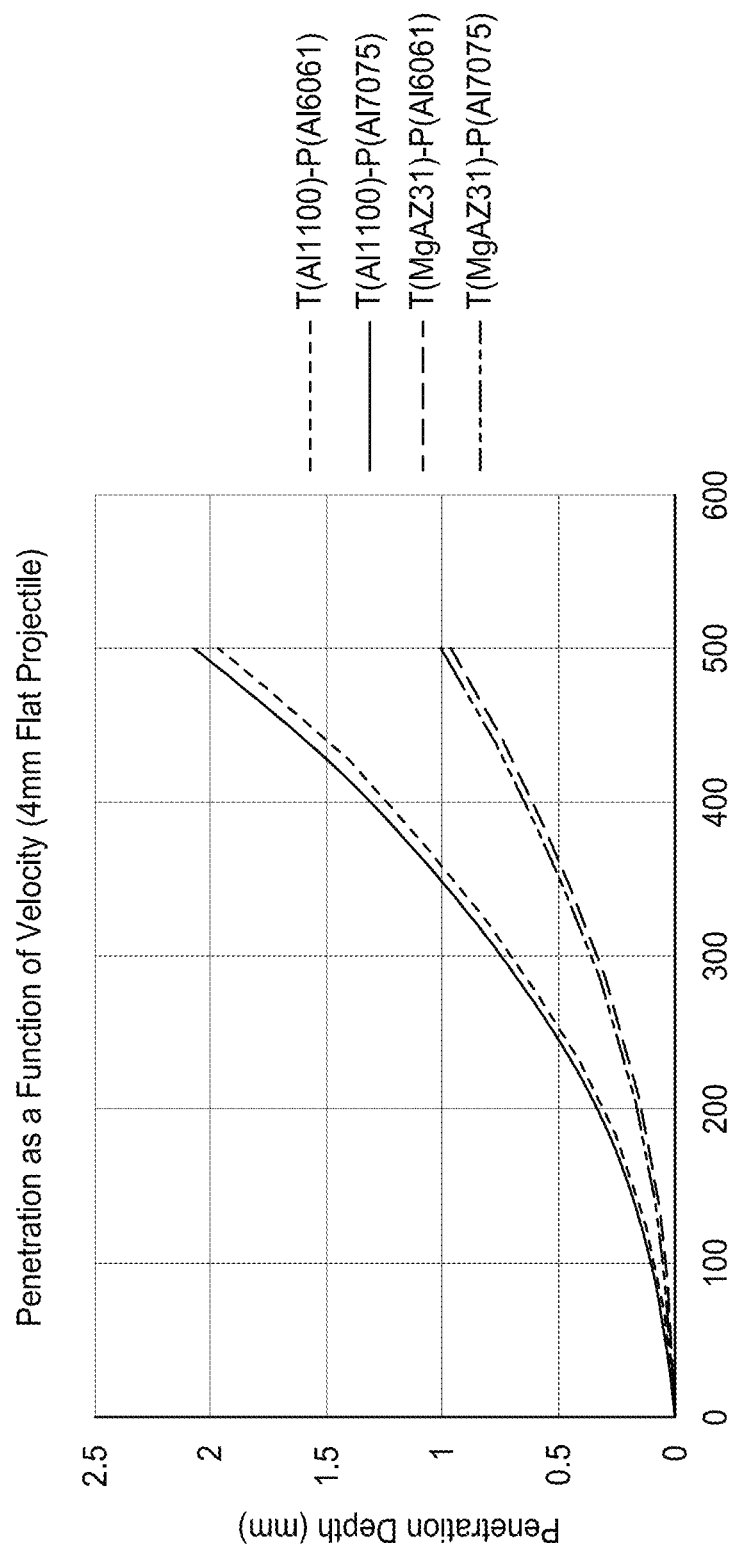
Figure 17C:
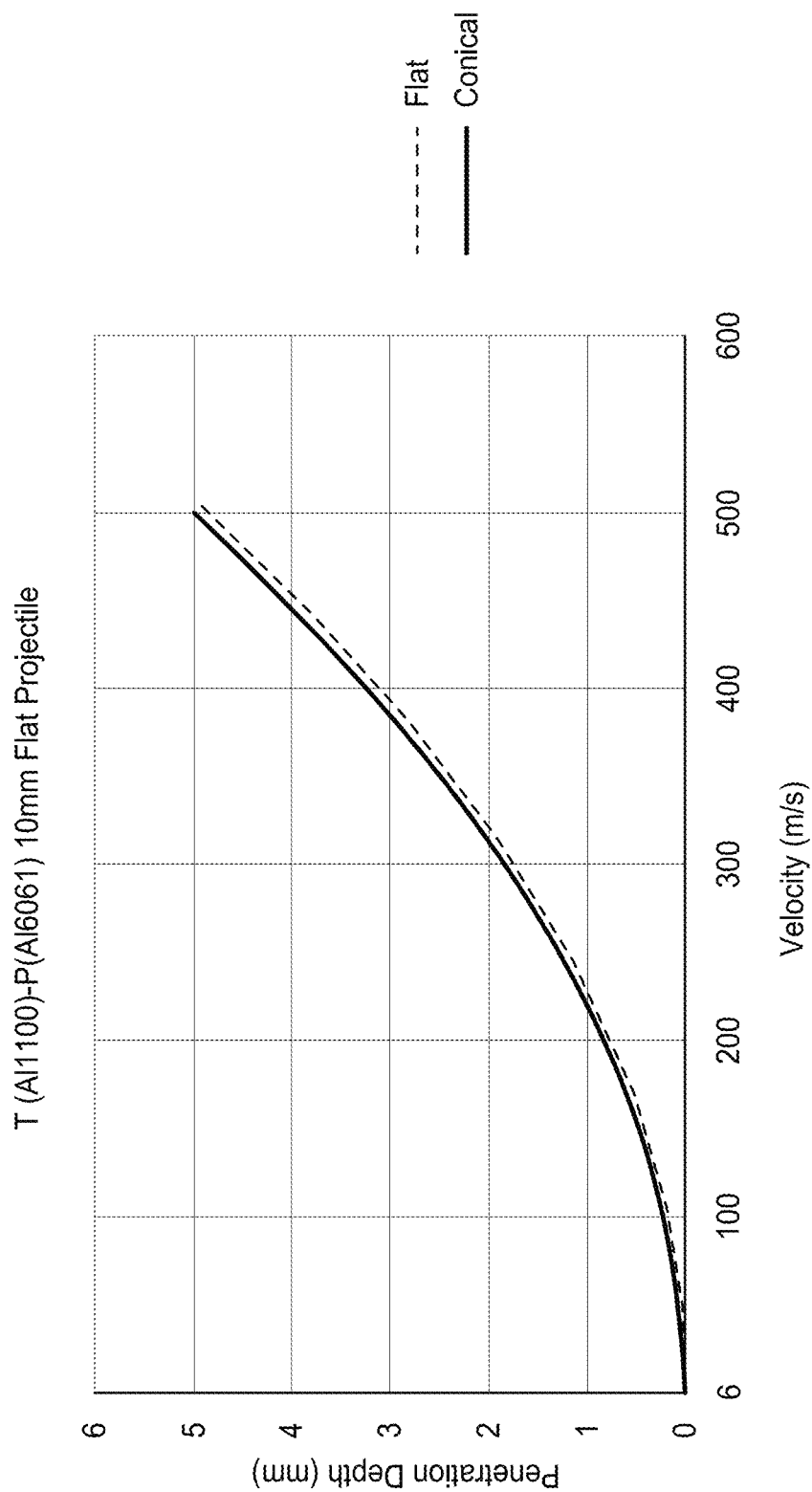

FIGS. 17A-C are graphs of rivet and material data under differing method conditions.

FIGS. 18-21 are depictions of rivet size and material projected at specified materials.

Figure 22A:
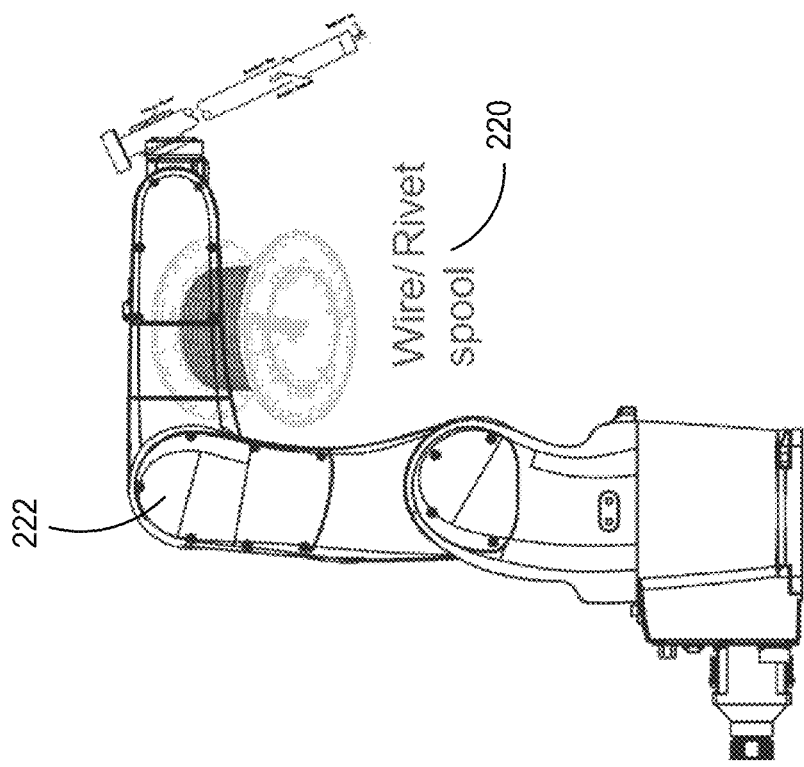
Figure 22B:
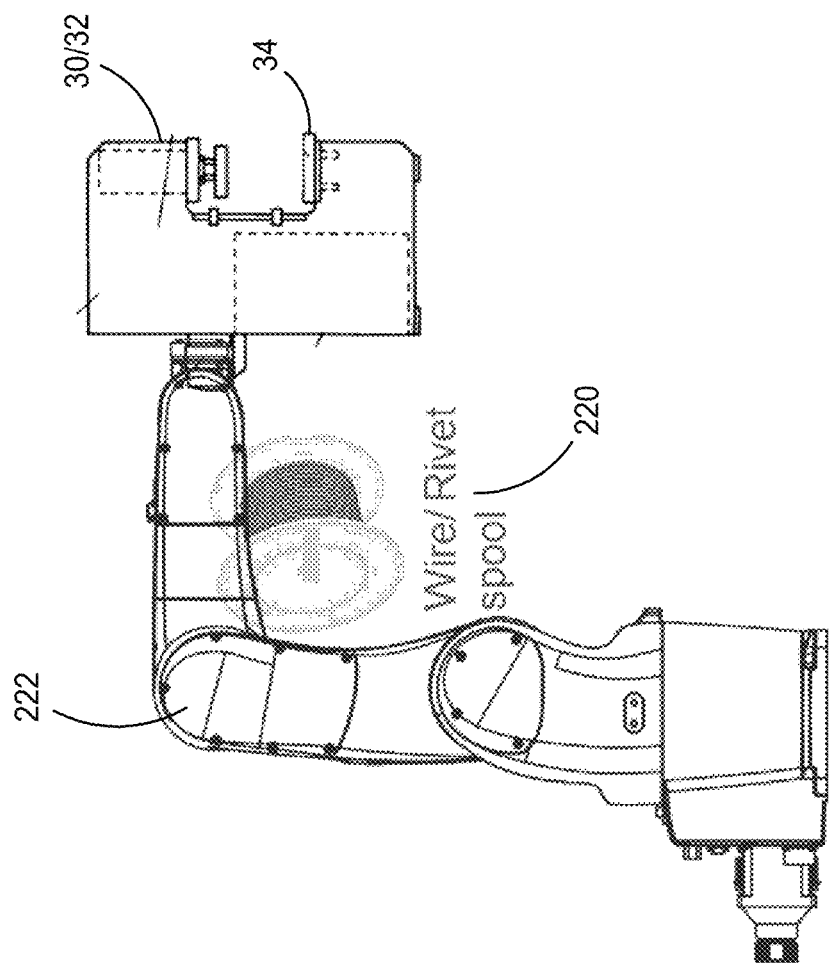

FIGS. 22A and 22B are exemplary riveting robots according to embodiments of the disclosure.

DESCRIPTION

This disclosure is submitted in furtherance of the constitutional purposes of the U.S. Patent Laws "to promote the progress of science and useful arts" (Article 1, Section 8).

The present disclosure will be described with reference to FIGS. 1-22B. Referring first to FIG. 1, a pair of components 10 are shown with component 12 abutting component 14. Component 12 can have first and second sidewalls 18 and 20, and component 14 can have third and fourth sidewalls 22 and 24, for example. Rivet 16 can have head 26 extending along a shank to an end 28. Included in dashed form is reference to additional materials 11A and 11B to clarify that the scope of this disclosure is not limited to a pair of components only. Rather, multiple materials can be affixed using this technology with the materials interlocking as shown and described. For example, rivets can be Al or Al alloy or Mg or Mg alloy for example with the components being of Mg or Mg alloy or Al or alloy. Rivets can be steel and at least one of the two components can be steel with the other of the components being Al or Al alloy or Mg or Mg alloy.

Rivet 16 can be projected into component 12 to a least pierce sidewall 18 and form an affixing interface that is depicted in many forms as 31A-D. In 31A for example, rivet end 28 does not pierce sidewall 20 or 22, but cause a deformation of the sidewall that affixes component 12 to component 14. This deformation can include an expansion of the material of component 12 into the material of component 14 while sufficient material of component 14 remains to couple the expansion and affix the components. This can be referred to as an interlock of the materials. In 31B for example, rivet end 28 may extend past the border established by the abutting components without entering the material of component 14. Accordingly, another deformation of the material of component 12 is formed that extends into the material of component 14. Again, this deformation can be an expansion of the material of component 12 that is coupled within the material of component 14, affixing the components. As shown in implementations 31A and 31B, while Al, Al alloy, Mg or Mg alloy rivets may be used, steel rivets may also be used to pierce first component 12, for example a steel component, without piercing second component 14, but affixing same with the interlocking deformation as shown.

In 31C for example, rivet end 28 can extend into the material of component 14. In this example, the rivet itself and/or together with a deformation may couple the components. In 31D for example, rivet end 28 may enter the material of component 14 and deform to affix the components. As can be seen, rivet end 28 does not exit sidewall 24 of component 14. Referring next to 31F of FIG. 1, rivet end 28 can be seen exiting the fourth sidewall 24 of second component 14. In accordance with example implementations, rivet 16 in this configuration can be an Al or Al alloy rivet or a Mg or Mg Alloy rivet.

This can be a single-step joining technique, deploying an aluminum alloy rivet for example at high strain rates to join the two materials at room temperature. Accordingly, two-work pieces can be riveted together, in a single inline operation, making the method compatible with existing body shop facility layout and line rate.

The methods and assemblies of the present disclosure can be used to overcome critical challenges for the automotive industry, including reducing the energy consumption of vehicles and their raw materials, while maintaining the performance, safety and driver experience. Cost effective lightweighting applications have been demonstrated to include the use of multi-material assemblies of advanced high strength steel, aluminum and cast magnesium to achieve strength, durability, strain rate sensitivity, temperature, fatigue and visual product application requirements. Joining technologies play a key part in enabling commercialization of these complex multi-material systems.

For example, full vehicle mass reduction targeted at 40% relative to the baseline of 2009 Toyota Venza with technology feasibility target of 2017 baseline for passenger vehicle, requires application of new multiple material combinations using novel low density, high strength material combinations which include application of magnesium (Mg) and aluminum (Al) alloy sheets for 2020 production. Conventional resistance spot welding poses material compatibility issues due to difficulties in breaking through the strong and high melting temperature native oxide layer on Al alloys and the formation of undesirable phases which can result in low fatigue strength and impact resistance and reduces the overall feasibility of this technique for many multi-material applications.

Riveting, a cold forming joining operation, can be used for joining of multi-material combinations. Self-piercing rivets (SPR) can be used for joining of dissimilar materials that are difficult to weld. Rivets used for SPR can be semi-tubular and are conventionally made from steel. The utilization of steel as the rivet material poses recyclability challenges and galvanic corrosion due to high galvanic potential between steel and Al and/or Mg. In accordance with example implementations, in addition to the overall weight reduction, rivets made from Al or Al alloys can be used to affix components. Alternative joining techniques can utilize Al or Al alloys as the riveting material while maintaining the performance and reducing the processing time.

Referring to FIG. 2, components 10 are affixed using rivet 16 that can be propelled using a charge 32. Charge 32 can be used to propel rivet 16 using a striker bar 30. In accordance with example configurations, charge 32 can be explosive or a pressure release of a prespecified amount to deliver a prespecified force to bar 30 which can be operatively aligned with rivet 16 to affix components 10. Electromagnetic and/or electrohydraulic force may be utilized as well, with or without the striker bar. In accordance with example implementations, components 10 can be supported by a backing material 34. Backing material 34 can have a predefined surface to facilitate a sufficiently interlocking interface deformation.

Figure 3:
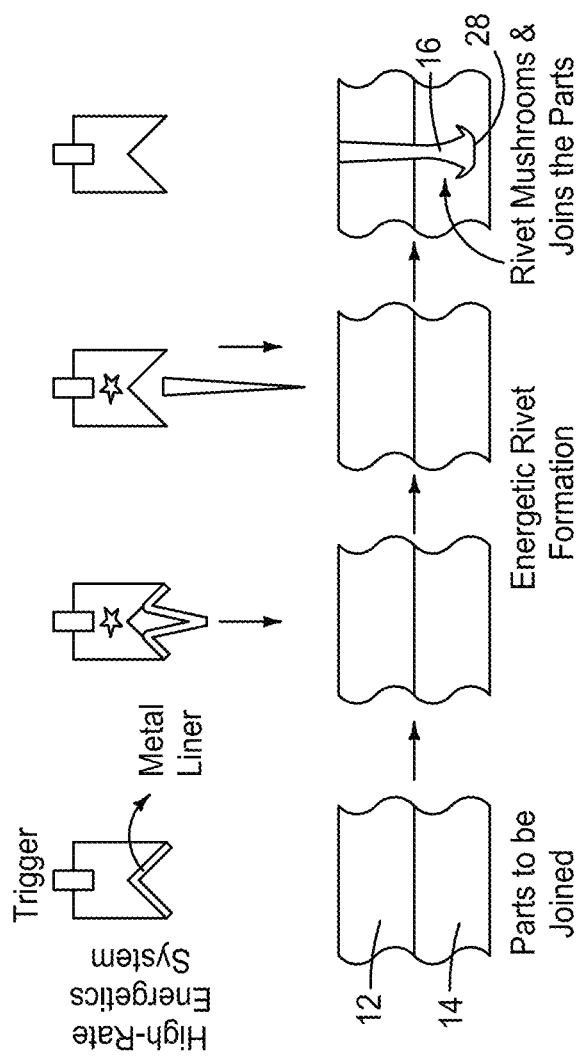
FIG. 3 is another example depiction of a method for affixing components according to another embodiment of the disclosure.

In accordance with example implementations and with reference to FIG. 3, shaped charge liners may be used to form a rivet 16 within components 12 and 14. Accordingly, an electromagnetic and/or electrohydraulic force can be used to join multi-material systems, effectively creating an aluminum rivet, while avoiding galvanic corrosion, cost and life cycle issues. This system can be utilized for example with minimal impact to existing body shop operations. As an example, the metal liner can be formed and propelled using and electromagnetic and/or electrohydraulic force to pierce component 12 and affix components 12 and 14. The liner can be Al or an Al alloy and, while one affixed assembly is shown, all assemblies having the rivet extending through the first sidewall of component 12 to within the component 12 are contemplated.

In accordance with example implementations, an impulsive load such as electromagnetic force can be used for the joining operation and evaluated with two different setups. The application of impulse can provide a short burst of energy to be converted to mechanical motion, utilizing the entire kinetic energy of a striker bar to a rivet or fastener to create a joint. This may provide for the reduction in the processing time as well as the potential for a better performance. Two different processing setups have been investigated: powder-actuated fastening tool (FIG. 4A) and gas-gun striker bar set-up (FIG. 4B). For the powder actuated fastening, a Ramset HammerShot® powder actuated tool can be utilized to investigate the feasibility of such technique for fastening and riveting of Al or Al alloy and Mg or Mg alloy component combinations. Schematics of the two setups can be seen in FIGS. 4A and 4B.

Figure 5B:
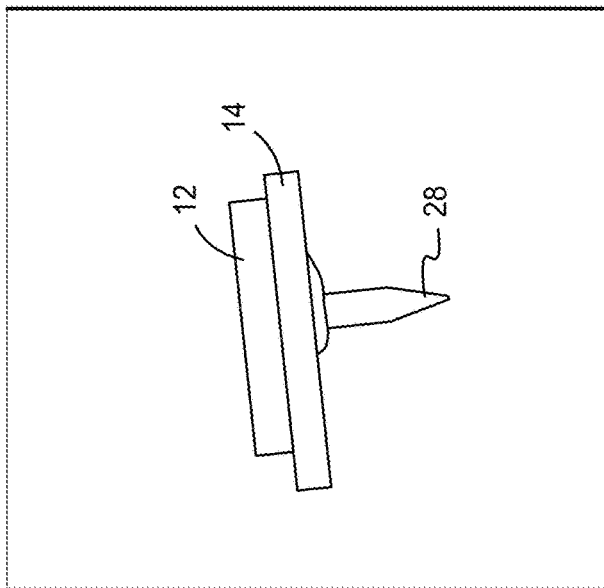
Figure 5D:
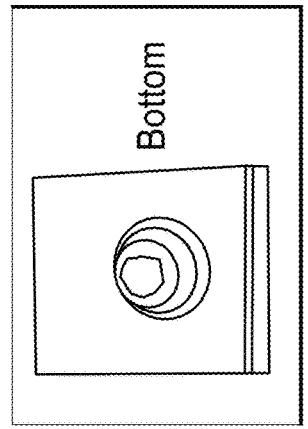
Figure 5A:
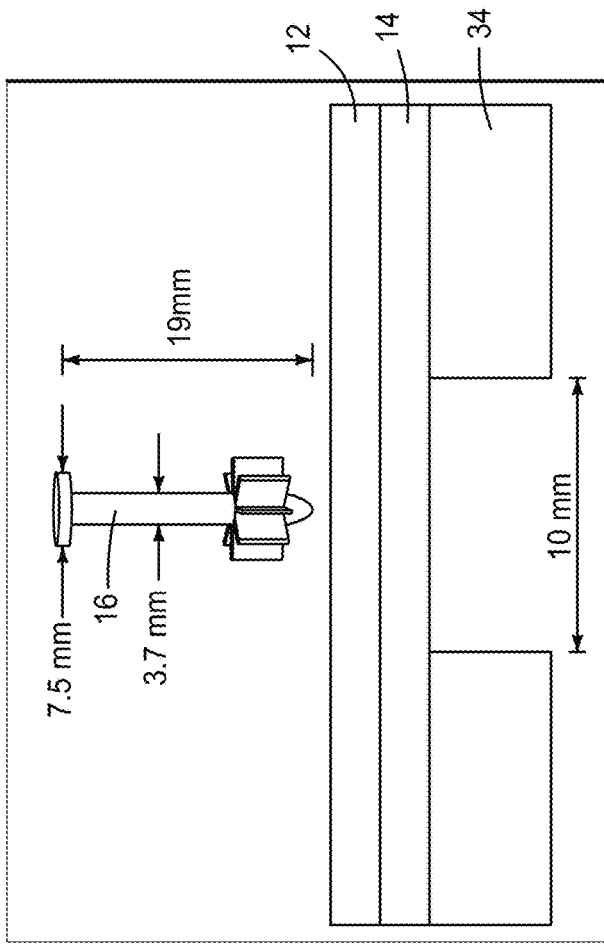
Figure 5C:
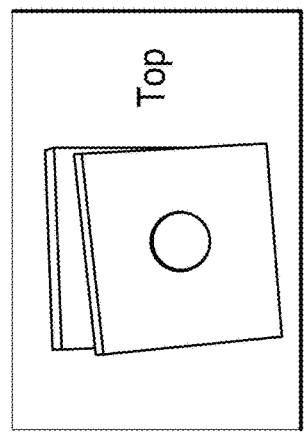

In accordance with example implementations, a powder actuated fastening of Al/Mg can be assessed: A Ramset HammerShot with three different power choices (low, medium and high) can be utilized to evaluate the penetration and joining of Mg and Al components. Al 1100 and Mg AZ31 sheets with thickness of 2.3 mm can be sectioned into square pieces of approximately 22 mm in length. Al (component 12) and Mg (component 14) sheets were placed on top of a tool steel plate backing material 34 with thickness, width and length of approximately 12 mm, 30 mm, and 300 mm respectively and a through-hole of approximately 10 mm in diameter. Rivets 16 with dimensions of 19 mm shaft length, 3.7 mm shaft diameter, and 7.5 mm head diameter with a conical tail or rivet end 28 can be machined from the Aluminum 7075 T6 and 6061 T6511 rods of 9.5 mm in diameter to replicate the Ramset steel fasteners of the same dimensions (FIG. 5A). The tool can be loaded with the powder cartridges and the rivet placed in the front end of the Ramset nozzle. The tool nozzle can be placed flush against the sheet stacks, actuated, and sheets are joined or affixed.

FIGS. 5A-D illustrate the schematic of this experimental setup (FIG. 5A), side (FIG. 5B), top (FIG. 5C) and bottom (FIG. 5D) views of a representative final joined stacks of two Mg AZ31 sheets or components. This process can include releasing a short burst of energy, and the fastener is inserted into target material.

Table 1 summarizes the experimental parameters along with penetration success of the fastener through the stacked sheets. Steel fasteners penetrated through five different combinations of Al and Mg sheets. For runs 1-5, the steel fastener penetrated through both sheets at low power level. At high power, a stack of four Mg sheets is targeted for penetration; however, the steel fastener only penetrated the first three sheets. Al 7075 fasteners did not penetrate through the top Mg sheet at low and medium powers but penetrated through both sheets of Mg at high power (run 10). By placing the Al sheet as the top material, the Al 7075 penetrated through Al/Mg sheets (runs 11-12). With Al 6061 as the fastener material, only Al/Al stack combination had successful penetration (run 13). Accordingly, an Al rivet can self-pierce and affix a pair of Al components and/or an Al/Mg pair of components.

During penetration through the aluminum sheet, significant plastic deformation can be seen around the perforated fastener (FIGS. 6A (top view) and 6B (bottom view)). For Mg/Mg material combination, minimal deformation of the sheets was observed around the perforated hole (FIG. 5D) which allowed a compressive residual stress at the interface between the sheets and fastener, interlocking the two sheets together mechanically.

TABLE 1

Powder actuated fastening summary

| Run# | Top Material (Alloy) | Bottom Material (Alloy) | Power Level | Fastener Material (Alloy) | Penetrated (Y/N) |
|---|---|---|---|---|---|
| 1 | Al | Al | Low | Steel | Y |
| 2 | Al | Al | Low | Steel | Y |
| 3 | Mg | Mg | Low | Steel | Y |
| 4 | Mg | Al | Low | Steel | Y |
| 5 | Al | Mg | Low | Steel | Y |
| 6 | Mg/Mg | Mg/Mg | High | Steel | Y (Penetrated through 3 layers) |
| 7 | Mg | Mg | Low | Al 7075 | N |
| 8 | Mg | Mg | Low | Al 7075 | N |
| 9 | Mg | Mg | Medium | Al 7075 | N |
| 10 | Mg | Mg | High | Al 7075 | Y (Projectile fractured after penetration) |
| 11 | Al | Mg | Low | Al 7075 | Y |
| 12 | Al | Mg | High | Al 7075 | Y |
| 13 | Al | Al | Low | Al 6061 | Y |
| 14 | Mg | Mg | Low | Al 6061 | N |
| 15 | Al | Mg | Medium | Al 6061 | N (Penetrated through Al only) |
| 16 | Al | Mg | High | Al 6061 | N |

Utilization of powder actuated fastening tools for joining of Mg and Al sheets (2.3 mm) with thick Mg and Al plates (24 mm, 12 mm, and 6 mm in thickness), steel fasteners at low and medium powers can be used in accordance with Table 2. For all these combinations, the fastener fully penetrated through the sheet and plate as seen in FIGS. 7A and 7B. While two materials are shown, a stack of 3 or more materials can be joined as well. As can be seen, deformation of the plates is localized to the periphery of the fastener/sheet interface. The resulting compressive residual stresses between the fastener and sheet/plate interface and the resulting larger surface area of contact can provide an interlocking affixing interface. To pull out the fastener from the sheet/plate combinations, the resulting dry frictional force needs to be overcome which is proportional to the magnitude of the resulting compressive residual stress. We can expect that a deep penetration of the fastener can result in a stronger joint, so for application where a large thickness of material is available, powder actuated fastening can be utilized.

TABLE 2

Powder actuated fastening of sheet/plate combination

| Run | Plate Thickness (in.) | Fastener | Sheet/Plate combination | Power |
|---|---|---|---|---|
| 1 | 1 | Steel | Mg AZ31/Cast Al | Medium |
| 2 | 1 | Steel | Al6061/Cast Mg | Medium |
| 3 | 0.5 | Steel | Mg AZ31/Cast Mg | Medium |
| 4 | 0.5 | Steel | Al6061/Cast Mg | Medium |
| 5 | 0.5 | Steel | Al6061/Cast Al | Low |
| 6 | 0.5 | Steel | Mg AZ31/Cast Al | Low |
| 7 | 0.25 | Steel | Mg AZ31/Cast Mg | Medium |
| 8 | 0.25 | Steel | Al6061/Cast Mg | Low |
| 9 | 0.25 | Steel | MgAZ31/Cast Mg | Low |
| 10 | 0.25 | Steel | Al6061/Cast Al | Low |
| 11 | 0.25 | Steel | MgAZ31/Cast Al | Low |

Typically, self-piercing riveting (SPR) utilizes semi-tubular rivets (the rivet defines a hollow portion typically having an open end) pushed directly into the sheets that are clamped together between a die and a blank holder in a pressing tool. Steel rivets are often used for this process to accommodate the high experienced stress during the riveting process. Unless corrosion protection coatings are applied to the rivet's surface, there exists a potential for galvanic corrosion between the steel rivet and the Mg and/or Al substrate. Thousands of steel rivets are used in fabrication of aluminum car bodies and the use of steel rivets makes recycling a challenge. Additionally, the replacement of steel rivet with aluminum counterparts can contribute to further weight reduction, recycle and improved fuel efficiency. Utilization of aluminum alloys as semi-tubular as the rivet material for the SPR process has been investigated and several challenges were observed. For example, the rivet often experienced non-axisymmetric failure by fracturing; when lower strength and higher ductility aluminum alloys were used, severe deformation of the rivet prevented formation of an interlock.

To overcome the challenges associated with the utilization of aluminum rivets in SPR, alternative riveting technique using cylindrical aluminum rivets (the rivets are not tubular in that the shanks and ends are solid) has been demonstrated for a proof of concept. Riveting is often performed under a quasi-static load thus the inertia force become negligible. Joining using an impulsive load has not been sufficiently investigated and can open opportunities for reduction in the process cycle time.

Here, we have demonstrated a riveting technique incorporating an impulse load to join Mg and Al alloy sheets. The term high strain rate riveting (HSRR) is used to refer to this riveting technique. Accordingly, a solid cylindrical aluminum, magnesium or steel alloy rivet along with an impulsive load as the loading mechanism can be utilized. Unlike SPR, the simple rivet geometry reduces the chance of geometrical instabilities during the riveting process. Two different processing set-ups were used to investigate the formation of a mechanical joint: 1) indirect acting power actuated tool, and 2) gas gun striker bar.

Rivets can be machined from Al 7075 T6. According to the schematic presented in FIG. 8A, a clamp was fabricated using high strength steel to hold the nozzle of the tool in the center using the setscrews and to clamp the sheets 12 and 14 to the steel plate 34 containing the die cavity 80 (FIG. 8B). Two die geometries with cavities 80 of 7 mm in diameter and 1.5 mm in depth were fabricated using a high strength tool steel. The first die geometry (die #1) has a straight cavity wall along the depth as shown in FIG. 8A, while the second die was fabricated with the cavity walls rounded (not shown here). Samples fabricated using the first die geometry were often stuck into the die cavity and fractured upon removal. The rounded die allowed easier removal of the riveted plates. Top view of a HSRR sample can be seen in FIG. 8C.

Figure 9A:
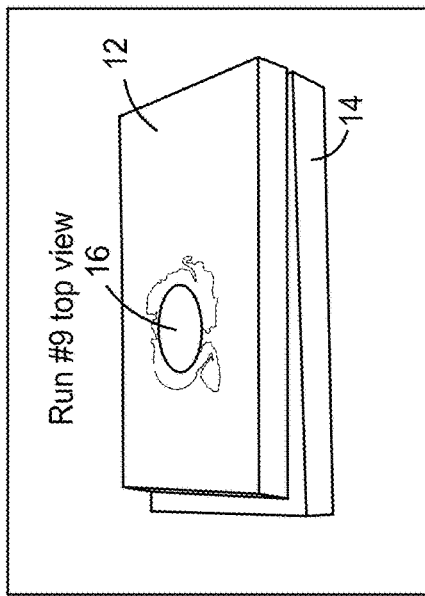
Figure 9B:
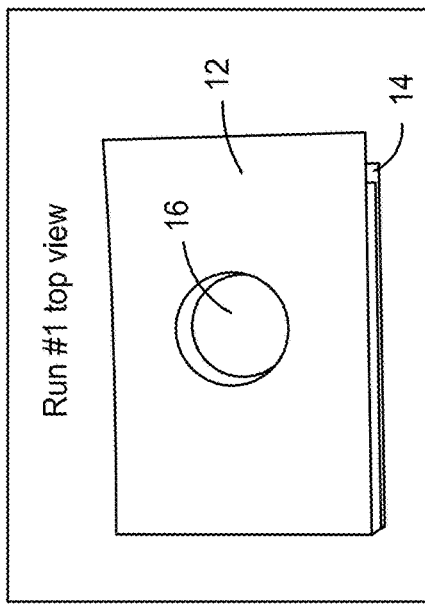
Figure 9C:
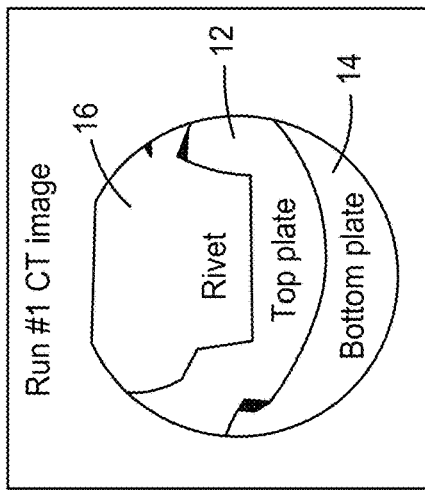
Figure 9D:
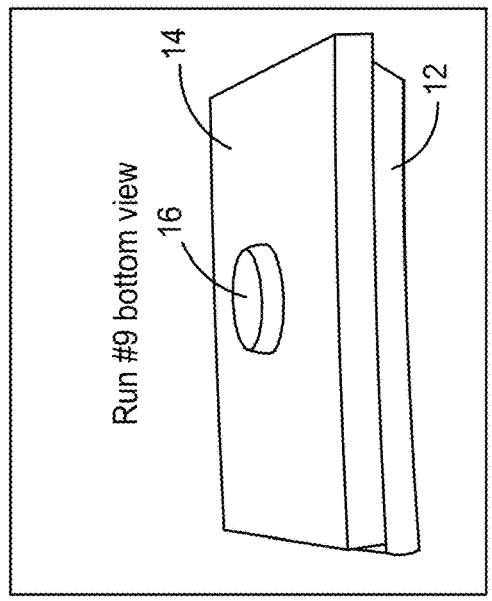
Figure 9E:
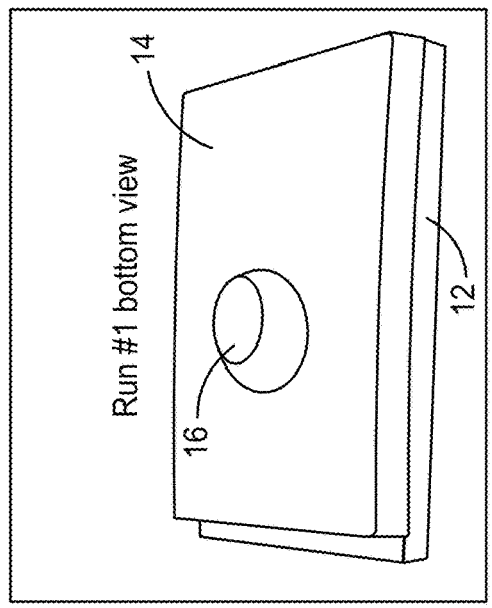
Figure 9F:
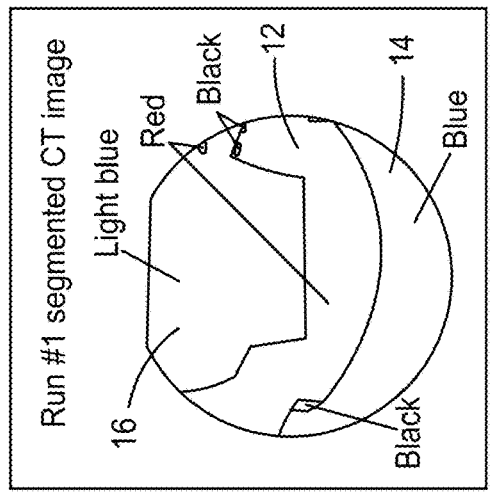

The summary of the experimental runs can be seen in Table 3. For experimental runs 1-4, die #1 with straight wall geometry cavity was used. The joined sheets were difficult to detach from the die cavity and often caused that region to fracture within the cavity (Run #2). A second die geometry (die #2) with a rounded die cavity wall was used to assist with separation of the joined sheets from the die cavity. FIGS. 9B and 9E show the top and bottom view of the HSRR Mg/Al stack riveted using die #1 (run #1). FIGS. 9C and 9F shows the cross-sectional X-ray computed tomography (XCT) scans of the same sample with rivet appearing deformed. It can be seen that the deformation of the rivet is unsymmetric with the top portion of the rivet being more deformed than the bottom portion of the rivet. For experiments performed using die #2, the sheets were often not joined together. FIGS. 9A and 9D presents the resulting joint stack using die #2.

TABLE 3

HSRR experimental summary

| Run | Power | Top/Bottom Sheets | Die Number |
|---|---|---|---|
| 1, 2 | Low | MgAZ31/Al6061 | 1 |
| 3 | Medium | Al1100/Al1100 | 1 |
| 4 | Medium | MgAZ31/Al6061 | 1 |
| 5 | Low | Al6061/Al6061 | 2 |
| 6-8 | low | Al6061/Mg AZ31 | 2 |
| 9-10 | Low | Mg AZ31/Al6061 | 2 |
| 11-12 | Low | Mg AZ31/Mg AZ31 | 2 |

Riveting can be performed the using a gas gun (FIG. 4B) for the striker. A cylindrical rivet with diameter of 5 mm and length of 5 mm were machined from Al 7075-T6 rods. The plates were fixed to a plate with a die cavity diameter of 10 mm. Once triggered, the moving striker bar impacts the rivet, forcing the rivet to emboss the sheets and forming a mechanical interlock. The two plates were configured in a lap shear arrangement with a 25 mm overlap. To determine the effectiveness of the HSRR, some specimens were scanned using XCT using a Nikon XTH 320/225 X-ray CT instrument. Mechanical performance of the rivets was determined by monotonic quasi-static (0.001 s-1) testing using an MTS electro-mechanical load frame with 10 kN load cell.

Table 4 summarizes the plate combinations, striker bar speeds, die hole depth, and maximum shear load experienced during the lap shear test of these samples. FIGS. 10A-F illustrate the bottom view and the respective CT image of the cross-section of the riveted samples. As can be seen in these configurations, using backing material 34 with a cavity 80, rivet 16 extends into component 12 and past sidewall 18 without extending past sidewall 24 as shown in FIG. 10E. Additionally, rivet end 28 may extend past sidewalls 20 and 22 without extending past sidewall 24. At all times in these configurations forming the interlocking affixing interface.

Figure 10A:
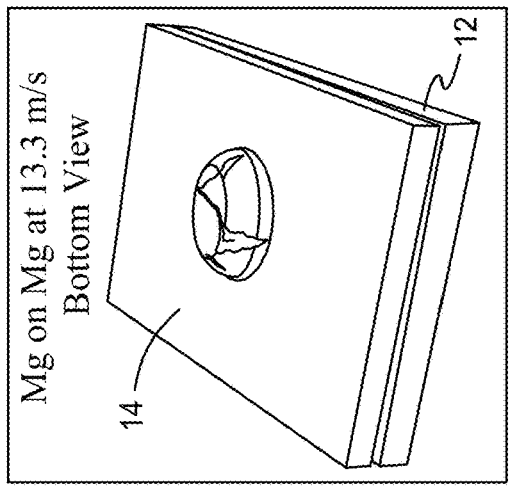
Figure 10B:
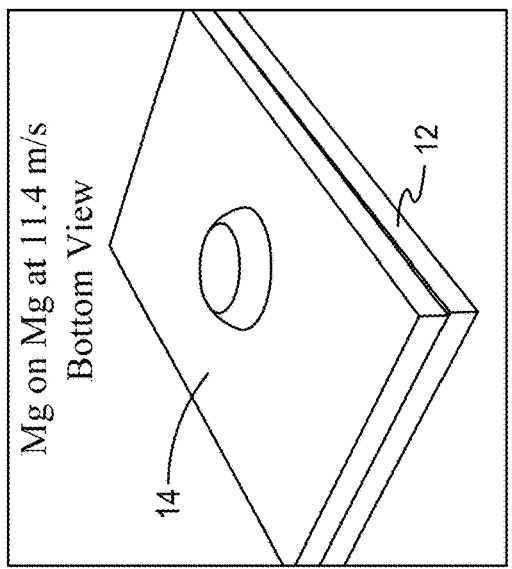
Figure 10C:
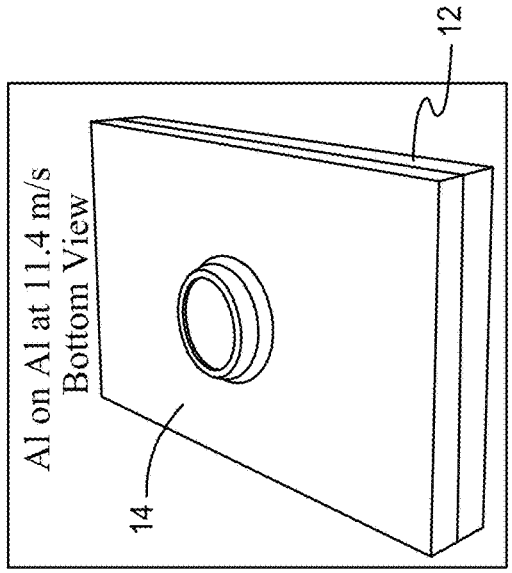
Figure 10D:
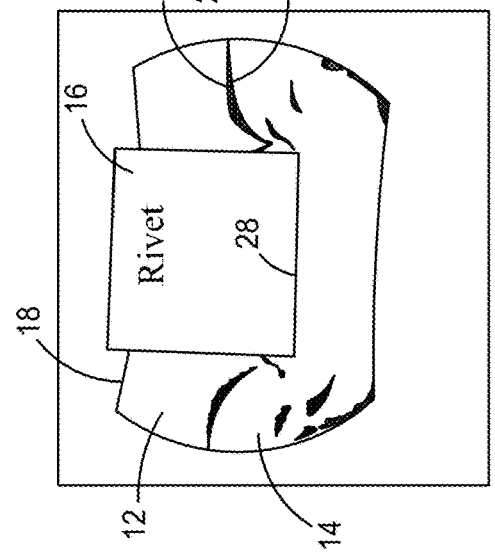
Figure 10E:
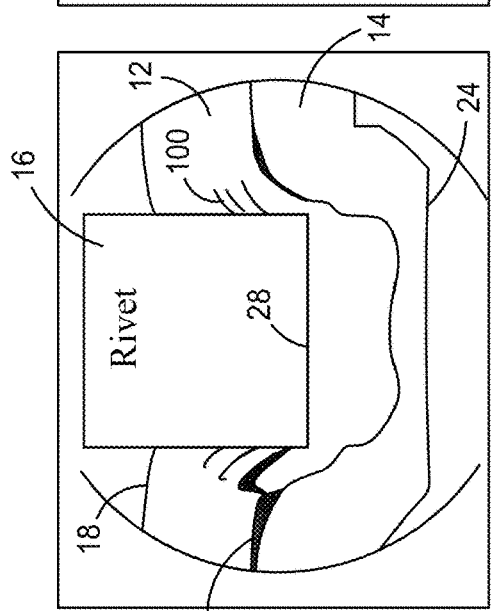

As seen in FIG. 10A, the bottom Mg sheet has cracks that are formed within the die cavity. When the Al sheet is situated as the bottom layer, the specimen is free of cracks (FIGS. 10B, 10C). Internal cracks 100 can be observed in the magnesium sheets in CT images presented in FIGS. 10E and 10F due to limited formability of Mg alloys. For the Al1100/Al1100 joint stack, a mechanical interlock can be observed in FIG. 10F. This mechanical interlock can accommodate a large stress prior to failure of the joint.

In accordance with example configurations and with reference to FIG. 11, another affixing apparatus is shown that includes a steel mass used to drive rivet 16 to affix components 12 and 14 above backing material 34 having cavity or die 80.

Figure 10F:
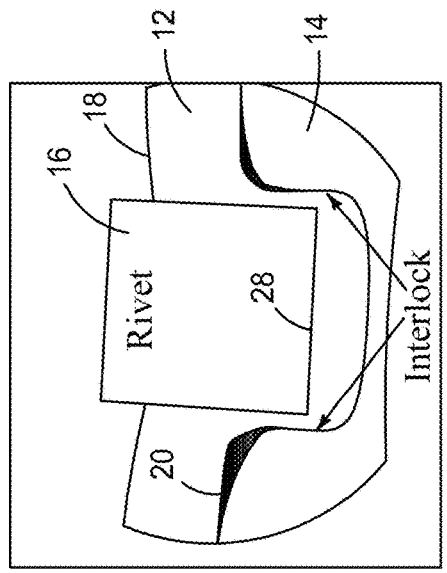

The load-extension curves for the lap shear testing of experiments summarized in Table 4 can be seen in FIG. 12. Al1100/Al1100 joints had systematically higher shear strengths as compared to Al/Mg and Mg/Al alloy sheet combinations. This is likely due to formation of a symmetric interlock as seen in FIG. 10F.

TABLE 4

Experimental summary of HSRR using the gas-gun set-up

| Plates (front-back) Alloys | Speed (m/s) | Die Hole Depth (mm) | Max Load (kN) |
| --- | --- | --- | --- |
| Al—Al | 13.3 | 1 | 2.44 |
| Al—Al | 13.3 | 0.5 | 2.36 |
| Al—Al | 15.8 | 1 | 2.44 |
| Al—Al | 15.8 | 0.5 | 2.68 |
| Al—Al | 16.4 | 1 | 2.45 |
| Al—Mg | 13.3 | 1 | 1.52 |
| Al—Mg | 15.8 | 1 | 1.93 |
| Al—Mg | 16.4 | 1 | 1.68 |
| Mg—Al | 15.8 | 1 | 1.68 |
| Mg—Al | 16.4 | 1 | 1.45 |

Figure 14B:
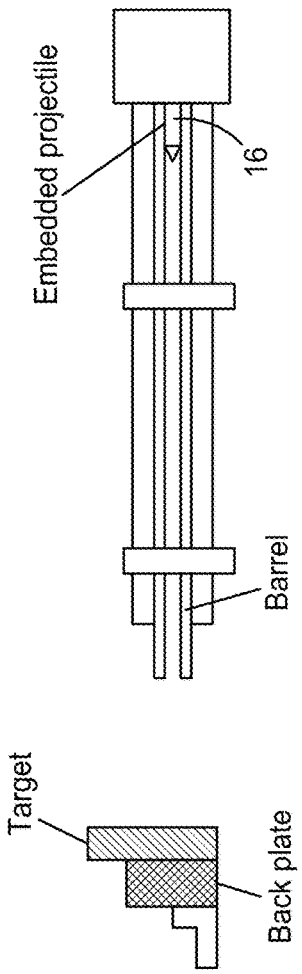

Referring next to FIG. 13, an impact response of materials is detailed. Accordingly, Vs between 50 and 1000 m/s can be accomplished with power guns and/or compressed air guns as shown. Two additional configurations of systems is shown in FIGS. 14A and 14B. In accordance with example implementations, the gas gun set up can be performed consistent with FIG. 14A, and the ballistics design can be performed consistent with FIG. 14B.

Example rivet configurations are depicted with reference to FIGS. 15A-C. Accordingly, rivet 16 can include a blunt head as shown in these Figures, in combination with a Blunt end (15A), a conical end (15B), and/or a hemispherical end (15C).

Referring next to FIG. 16, runs 2-4 of Table 5 below are shown.

TABLE 5

| Run# | Top Material Alloy | Bottom Material Alloy | Power Level | Projectile Material Alloy | Penetrated (Y/N) |
| --- | --- | --- | --- | --- | --- |
| 1 | Al | Al | Low | Steel | Y |
| 2 | Al | Al | Low | Steel | Y |
| 4 | Mg | Mg | Low | Steel | Y |
| 10 | Mg | Al | Low | Steel | Y |
| 11 | Al | Mg | Low | Steel | Y |
| 12 | Mg/Mg | Mg/Mg | High | Steel | Y (pass through 3 layers and then stopped) |
| 6 | Mg | Mg | Low | Al 7075 | N |
| 7 | Mg | Mg | Low | Al 7075 | N |
| 8 | Mg | Mg | Medium | Al 7075 | N |
| 9 | Mg | Mg | High | Al 7075 | Y (Projectile fractured after penetration) |

TABLE 5-continued

| Run# | Top Material Alloy | Bottom Material Alloy | Power Level | Projectile Material Alloy | Penetrated (Y/N) |
| --- | --- | --- | --- | --- | --- |
| 13 | Al | Mg | Low | Al 7075 | Y |
| 15 | Al | Mg | High | Al 7075 | Y |
| 3 | Al | Al | Low | Al 6061 | Y |
| 5 | Mg | Mg | Low | Al 6061 | N |
| 14 | Al | Mg | Medium | Al 6061 | N (past through Al only) |
| 16 | Al | Mg | High | Al 6061 | N |

Referring next to FIGS. 17A-C, penetrated depths of various rivets binding various materials are shown.

Figure 18:
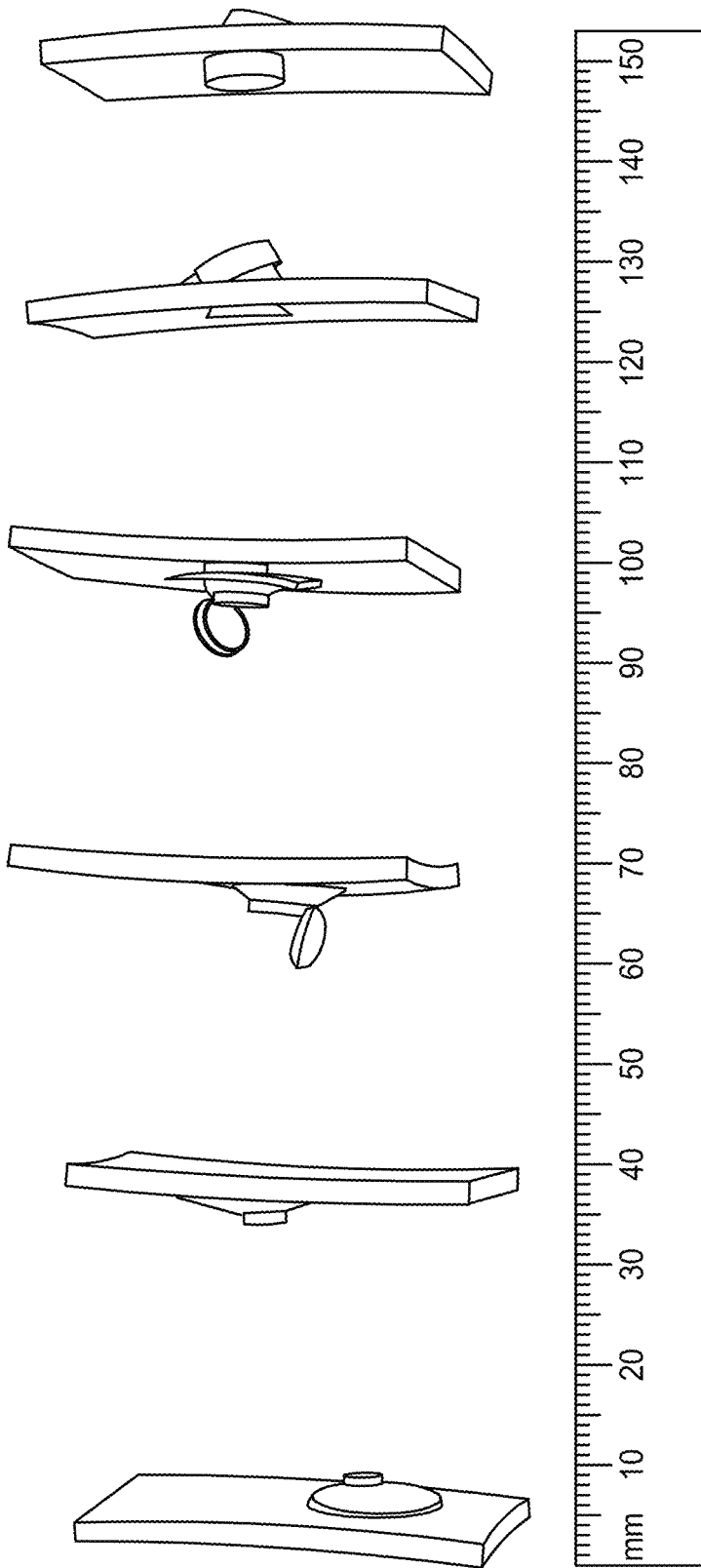

In FIG. 18 the results of a range of diameters of 7075 projectiles is shown and projected through Al plates with the diameter increasing from left to right.

Figure 19:
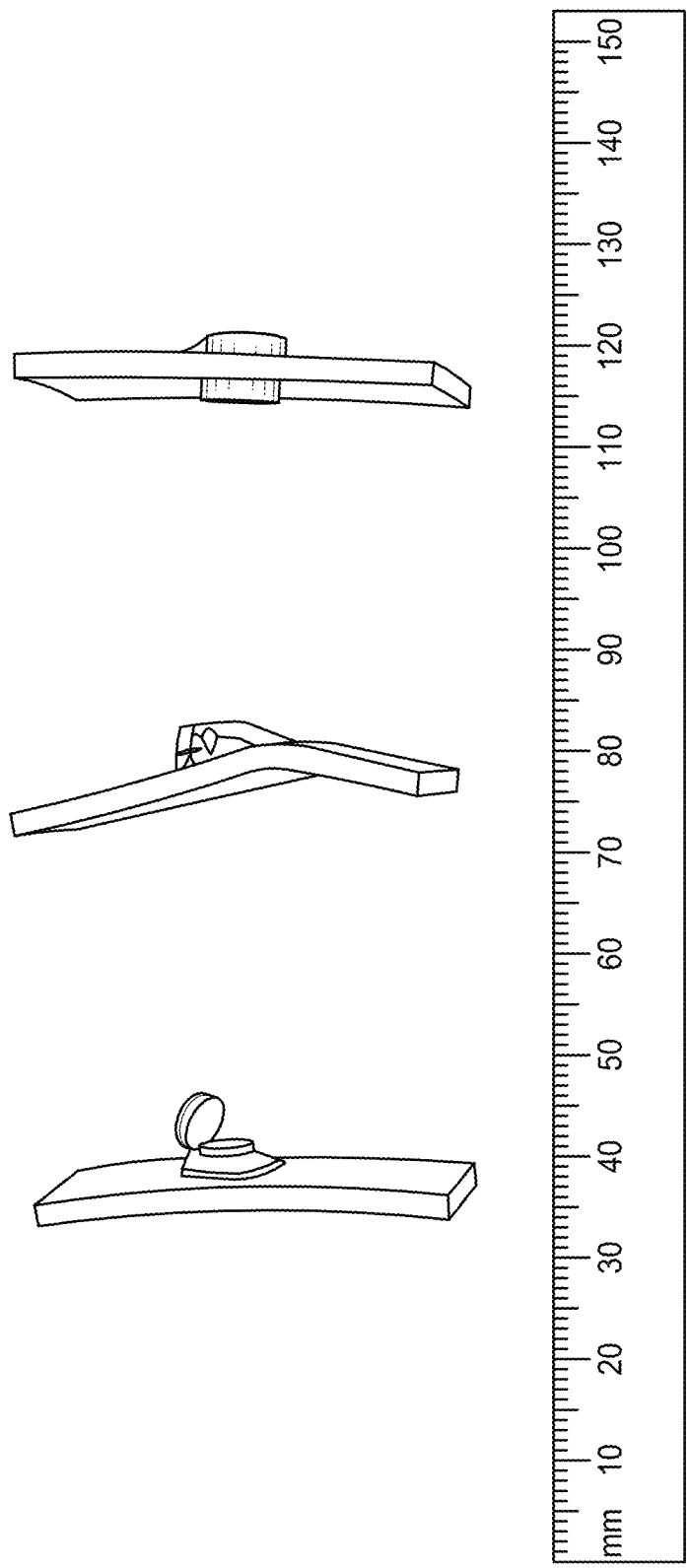

In FIG. 19 the results of a range of diameters of 6061 projectiles is shown and projected through Al plates with the diameter increasing from left to right.

Figure 20:
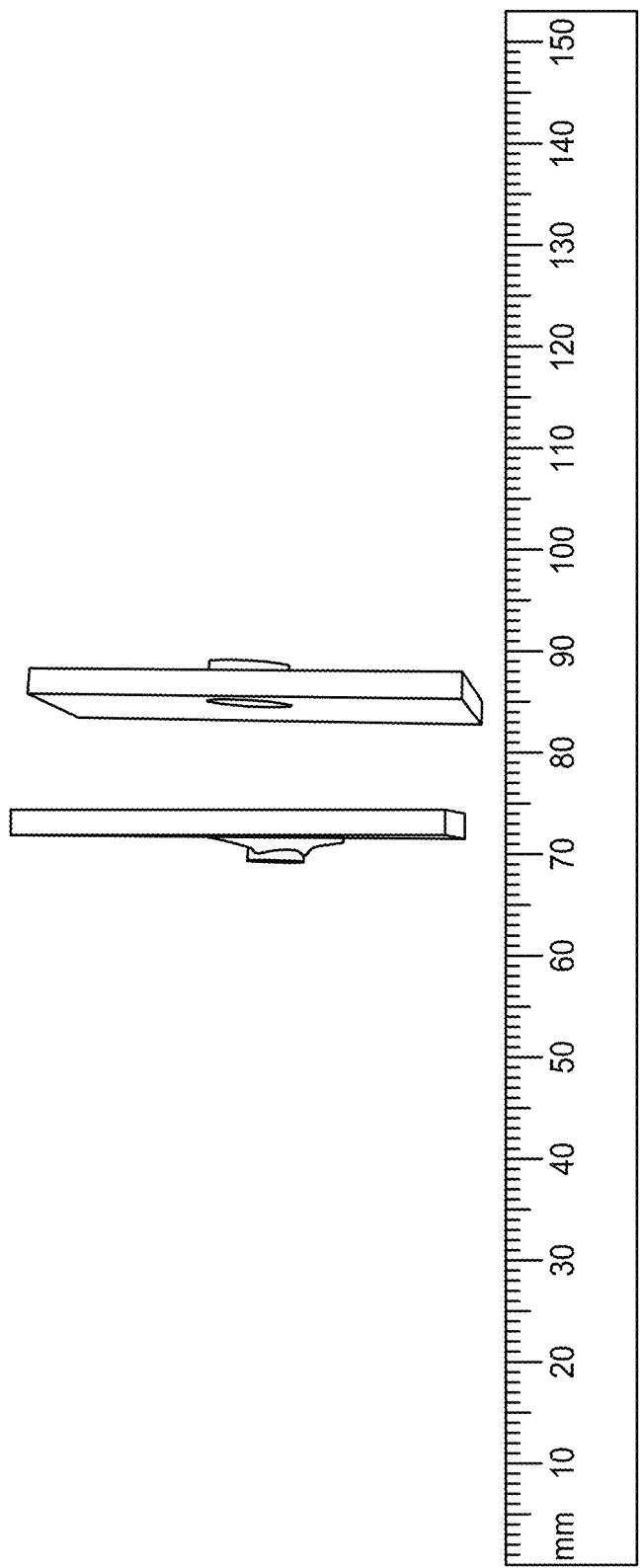

In FIG. 20 the results of a range of diameters of 7075 projectiles is shown and projected through Mg plates with the diameter increasing from left to right.

Figure 21:
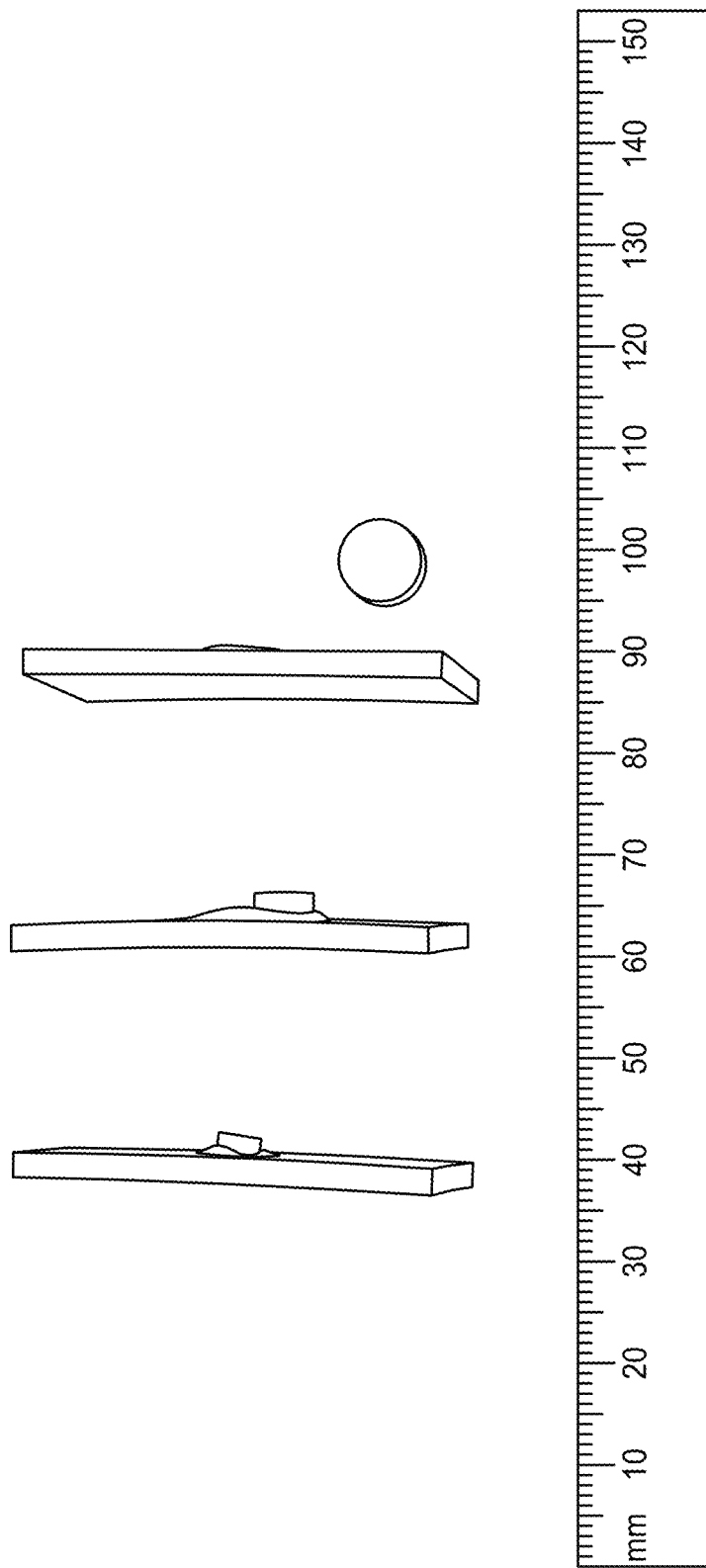

In FIG. 21 the results of a range of diameters of 6061 projectiles is shown and projected through Mg plates with the diameter increasing from left to right.

Additionally, it is contemplated that the solid rivet material can be provided in spools 220 and these spools can be utilized by and/or incorporated into robotics equipment 222. Accordingly, equipment 222 can be configured to select a portion of the spooled rivet material, separate the portion and provide the portion to a riveting interface that can include bar 32/charge 30 opposing backing material 34.

In compliance with the statute, embodiments of the invention have been described in language more or less specific as to structural and methodical features. It is to be understood, however, that the entire invention is not limited to the specific features and/or embodiments shown and/or described, since the disclosed embodiments comprise forms of putting the invention into effect. The invention is, therefore, claimed in any of its forms or modifications within the proper scope of the appended claims appropriately interpreted in accordance with the doctrine of equivalents.

The invention claimed is:

1. A riveted assembly comprising:
    a first component having opposing first and second surfaces;
    a second component having opposing third and fourth surfaces, wherein the second surface of the first component abuts the third surface of the second component to bind and form an affixing interface comprising the second and third surfaces between the first component to the second component, wherein the affixing interface comprises interlocking deformed portion of the first and second components; and
    a rivet extending between a head along a shank to an end, the end of the rivet being between the first and fourth surfaces.

2. The riveted assembly of claim 1 wherein the end of the rivet is between the first and second surfaces.

3. The riveted assembly of claim 1 wherein the end of the rivet is between the third and fourth surfaces.

4. The riveted assembly of claim 1 wherein the first component comprises Al or Al alloy.

5. The riveted assembly of claim 4 wherein the second component comprises Al or Al alloy.

6. The riveted assembly of claim 4 wherein the second component comprises Mg or Mg Alloy.

7. A method for affixing at least two components using a rivet, the method comprising:
- providing a first component having opposing first and second surfaces;
- providing a second component having opposing third and fourth surfaces;
- abutting the second surface of the first component to the third surface of the second component;
- using a striking bar to provide a rivet extending between a head along a shank to an end; and
- projecting the rivet through at least the first surface of the first component to form an affixing interface comprising the second and third surfaces.

8. The method of claim 7 wherein the striker bar is powered by the release of high pressure.

9. The method of claim 7 wherein the striker bar is powered by munitions.

10. The method of claim 7 further comprising providing the rivet in the form of a spool to robotics equipment configured to remove a select portion of the spooled material and use same as a rivet.

* * * * *